(12) United States Patent
Miyazaki et al.

(10) Patent No.: US 8,488,142 B2
(45) Date of Patent: Jul. 16, 2013

(54) DOCUMENT MANAGEMENT SUPPORT SYSTEM INCLUDING INFORMATION MEDIUM CONTROLLERS THAT COMMUNICATE WITH AN INFORMATION MANAGEMENT SERVER

(75) Inventors: Shingo Miyazaki, Fuchu (JP); Tomoaki Morijiri, Chofu (JP); Minako Ogawa, Fuchu (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 0 days.

(21) Appl. No.: 13/306,149

(22) Filed: Nov. 29, 2011

(65) Prior Publication Data

US 2012/0105901 A1    May 3, 2012

Related U.S. Application Data

(63) Continuation of application No. PCT/JP2010/058961, filed on May 27, 2010.

(30) Foreign Application Priority Data

May 29, 2009 (JP) ................................. 2009-130382

(51) Int. Cl.
    *G06K 15/00* (2006.01)
    *G06F 3/12* (2006.01)

(52) U.S. Cl.
    USPC ........................................ 358/1.14; 358/1.15

(58) Field of Classification Search
    None
    See application file for complete search history.

(56) References Cited

U.S. PATENT DOCUMENTS

| | | | |
|---|---|---|---|
| 6,597,469 B1 * | 7/2003 | Kuroyanagi | 358/1.15 |
| 7,460,692 B2 * | 12/2008 | Mizutani et al. | 382/118 |
| 8,249,885 B2 * | 8/2012 | Berkowitz et al. | 705/1.1 |
| 2008/0106756 A1 | 5/2008 | Okamoto | |
| 2009/0161149 A1 * | 6/2009 | Noguchi et al. | 358/1.15 |

FOREIGN PATENT DOCUMENTS

| | | |
|---|---|---|
| JP | 2000-151581 | 5/2000 |
| JP | 2002-342451 | 11/2002 |
| JP | 2005-258933 | 9/2005 |
| JP | 2005-309881 | 11/2005 |

(Continued)

OTHER PUBLICATIONS

International Search Report mailed Jun. 29, 2010 in PCT/JP2010/058961 filed May 27, 2010 (with English Translation).
International Written Opinion mailed Jun. 29, 2010 in PCT/JP2010/058961 filed May 27, 2010.

*Primary Examiner* — Vincent Rudolph
(74) *Attorney, Agent, or Firm* — Oblon, Spivak, McClelland, Maier & Neustadt, L.L.P.

(57) ABSTRACT

According to one embodiment, an information management server apparatus transmits processing result information that includes management register information including a child management ID when traceable duplication request information received from an information medium controller satisfy an access control policy and a permission policy. On the basis of the processing result information, the information medium controller outputs document print data that includes the child management ID tag and an electronic data body, and management register data including the management register information. When a paper document printed by the document print data is collected after being distributed, the information medium controller transmits a collection completion update request including the child management ID read from the paper document by an exclusive reader. On the basis of the child management ID in the collection completion update request, the information management server apparatus updates the status information to "collected".

3 Claims, 23 Drawing Sheets

FOREIGN PATENT DOCUMENTS

| | | |
|---|---|---|
| JP | 2007-122315 | 5/2007 |
| JP | 2008-117337 | 5/2008 |
| JP | 2008-137233 | 6/2008 |
| JP | 2008-158890 | 7/2008 |
| JP | 2009-33512 | 2/2009 |
| JP | 2009-77107 | 4/2009 |

* cited by examiner

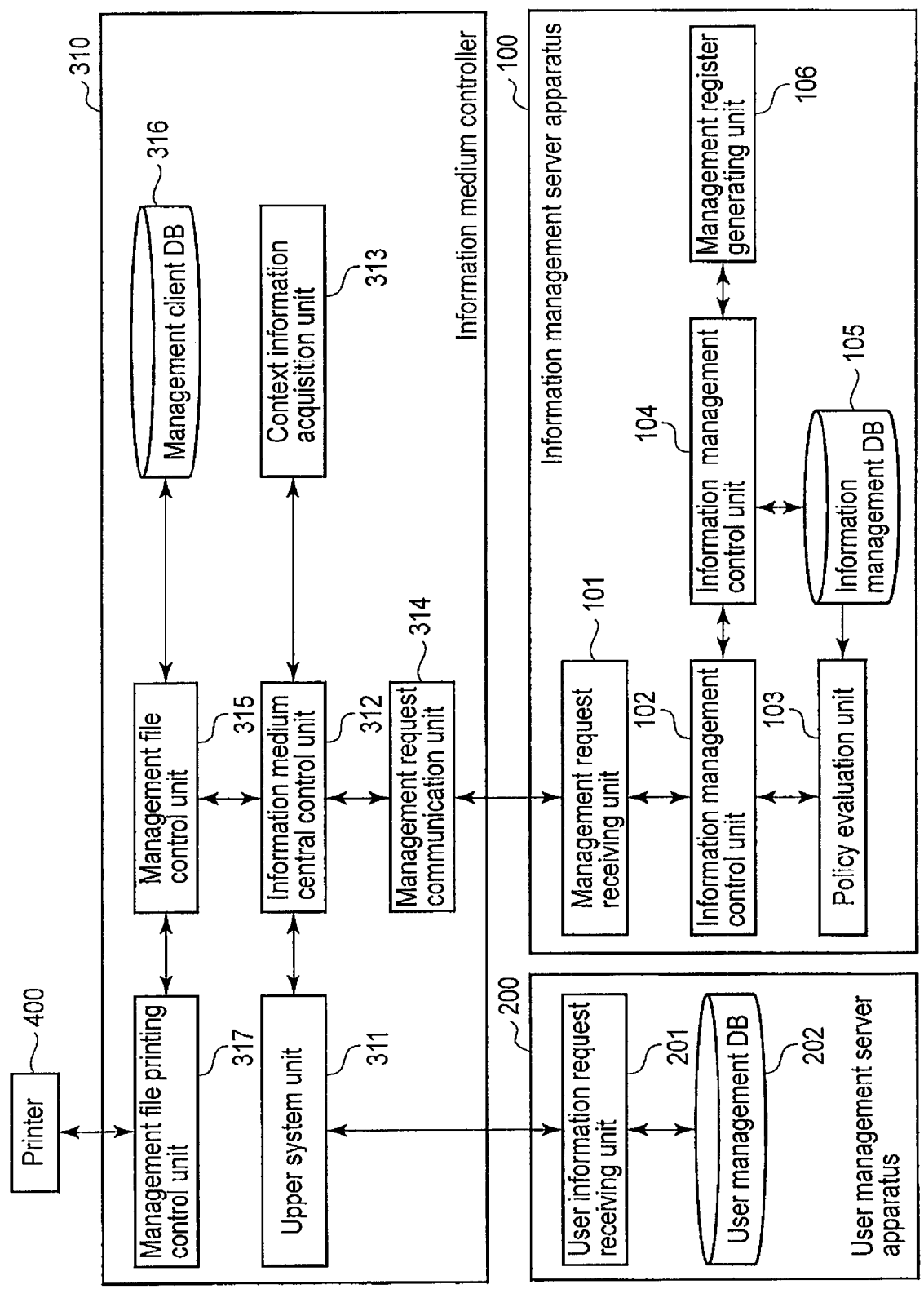
F I G. 5

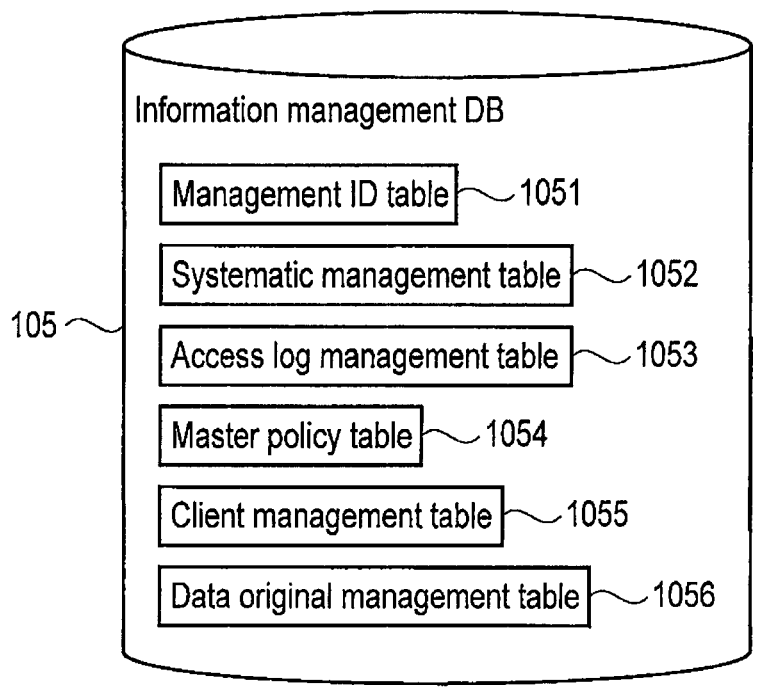

FIG. 6

| 1051 |
|---|
| Management ID table |

| Manage-ment ID | Date of issuance | Issuance request source information | Date of expiration | Expired request source information |
|---|---|---|---|---|
| 1000101 | yyyy/mm/dd | Device A (ip:10.xxx.xx.x) | — | Device A (ip:10.xxx.xx.x) |
| 1001101 | yyyy/mm/dd | Device A (ip:10.xxx.xx.x) | — | Device A (ip:10.xxx.xx.x) |
| 1001102 | yyyy/mm/dd | Device A (ip:10.xxx.xx.x) | — | Device A (ip:10.xxx.xx.x) |
| 1001201 | yyyy/mm/dd | Device A (ip:10.xxx.xx.x) | — | Device A (ip:10.xxx.xx.x) |
| 1001301 | yyyy/mm/dd | Device A (ip:10.xxx.xx.x) | — | Device A (ip:10.xxx.xx.x) |
| 1002101 | yyyy/mm/dd | MFP X (ip:10.xxx.xx.x) | yyyy/mm/dd | MFP X (ip:10.xxx.xx.x) |

FIG. 7

| Access log management table | | | | |
|---|---|---|---|---|
| Date | Client ID | Type of operation | Management ID | Processing status |
| 2008/04/12 10:22 | 101 | Initial registration | 1000101 | Success |
| 2008/04/22 11:23 | 232 | Copying request | — | Success |
| 2008/04/22 16:03 | 001 | Printing request | 1000102 | Success |
| ... | ... | ... | ... | ... |
| 2008/09/27 15:32 | 931 | Printing request | — | Authentication error |
| 2008/09/27 15:41 | 543 | Copying request | — | Success |

FIG. 9

Master policy table ~1054

| Policy number | Type of policy | Rejection/permission policy |
|---|---|---|
| 001 | Location control | IP address is "172.xx.xxx.xxx→in-company wired connection", and all commands are permitted |
| 002 | Location control | IP address is "10.xx.xxx.xxx→in-company wireless connection", and initial registration is only permitted |
| 003 | Location control | "172.xx.xxx.xxx→in-company wired connection" is set, and all commands are rejected |
| 004 | Time control | During command reception times 02:00 to 06:00, all commands are rejected |
| 005 | Permission control | When user attribute does not represent executive, information disposal command is rejected |
| ... | ... | ... |

F I G. 1 0

1055

| Client management table | | | | |
|---|---|---|---|---|
| Client ID | User ID | Authority class | Type of terminal | MAC address |
| 0001 | 00000001 | Executive | Desktop PC | XXXXXXXX |
| 0002 | 00000001 | Executive | Notebook PC | XXXXXXXX |
| 0004 | 00000009 | Regular employee | Company mobile | XXXXXXXX |
| ... | ... | ... | ... | ... |
| 8999 | 00004001 | Manager | Notebook PC | XXXXXXXX |
| 9000 | 00005223 | Regular employee | Desktop PC | XXXXXXXX |

F I G. 1 1

1056

| Data original management table | |
|---|---|
| Entity ID | Identification ID of data original |
| File name | File name of management target data body to be stored in management file |
| Size | File size of management target data body to be stored in management file |
| Hash value | Hash value of management target data body to be stored in management file |
| Electronic data body | Management target data body to be stored in management file (when stored in information management DB) |
| External storage information | When management target data body is separately saved outside information management DB, information on where management target data body is saved is shown |

F I G. 1 2

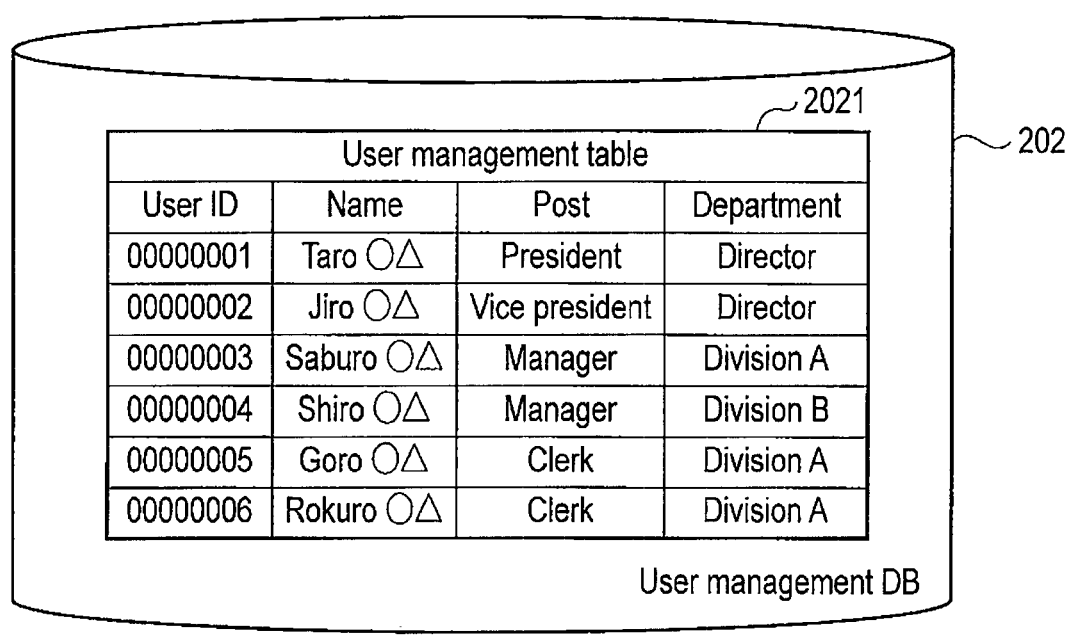
F I G. 1 3

316

3161

| Management file management table |||| 
|---|---|---|---|
| Management ID | Status | Management file header portion information | Management file entity |
| 1000101 | Now viewed | alive (2008/04/22~) | 1000101.ilc |
| 1001101 | — | dead (2008/06/12~2008/09/17) | — |
| 1010101 | Available | alive (2008/05/19~) | 1001102.ilc |
| 1020101 | Available | alive (2008/06/11~) | 1001201.ilc |
| 1030101 | — | dead (2008/07/30~2008/09/27) | — |

3162

| Access log table ||||
|---|---|---|---|
| Date | Type of operation | Management ID | Management file name |
| 2008/04/12 10:22 | Log-in | — | — |
| 2008/04/22 11:23 | Initial registration | 1000101 | — |
| 2008/04/22 13:00 | Duplication registration | 1001101 | — |
| 2008/04/22 16:03 | Duplication acquisition | 1001101 | 1030101.ilc |
| 2008/04/22 16:10 | View | 1030101 | 1030101.ilc |
| 2008/09/27 15:32 | Print | 1030101 | 1030101.ilc |
| 2008/09/27 15:41 | Erase | 1030101 | 1030101.ilc |

FIG. 14

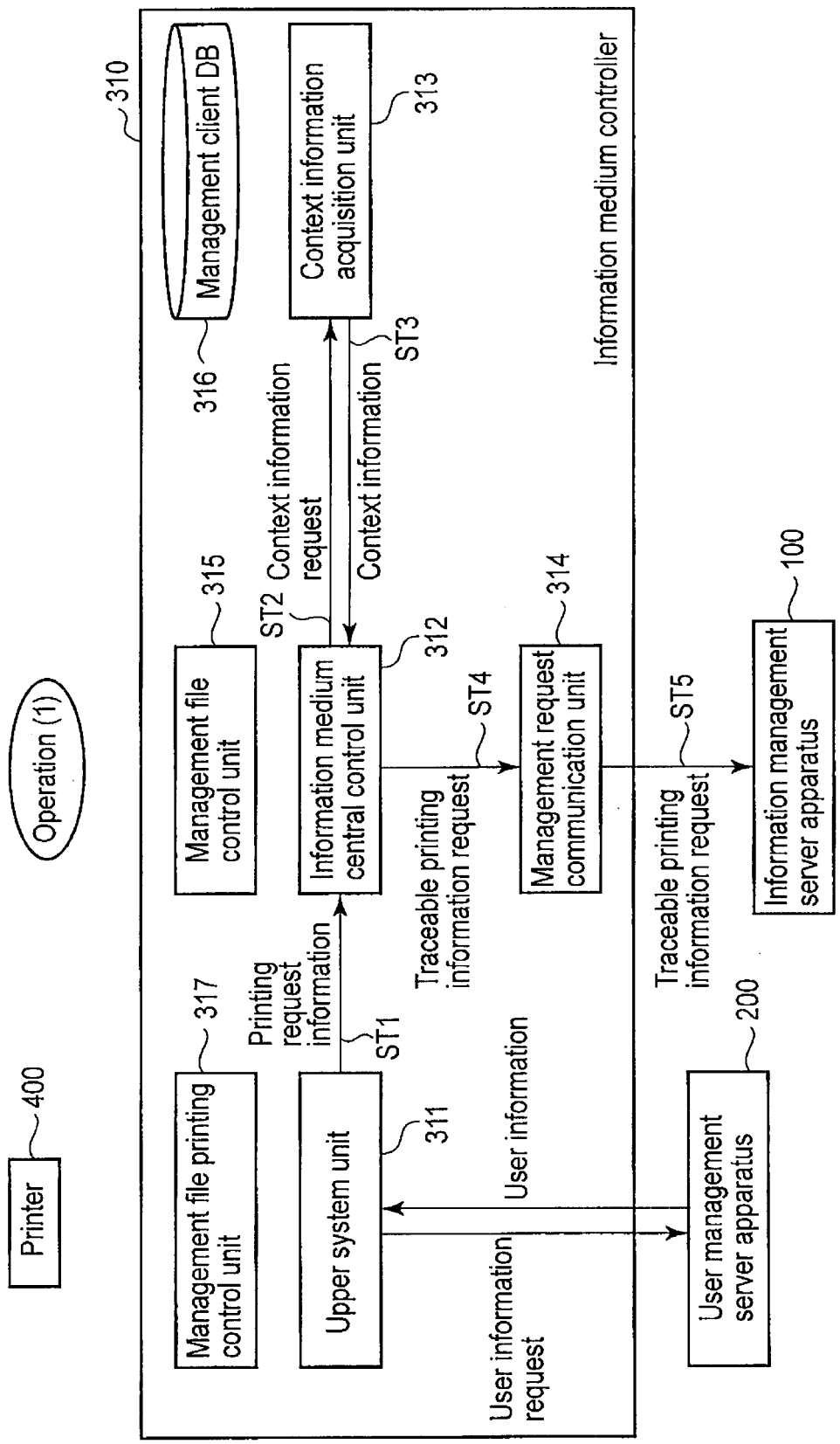
F I G. 15

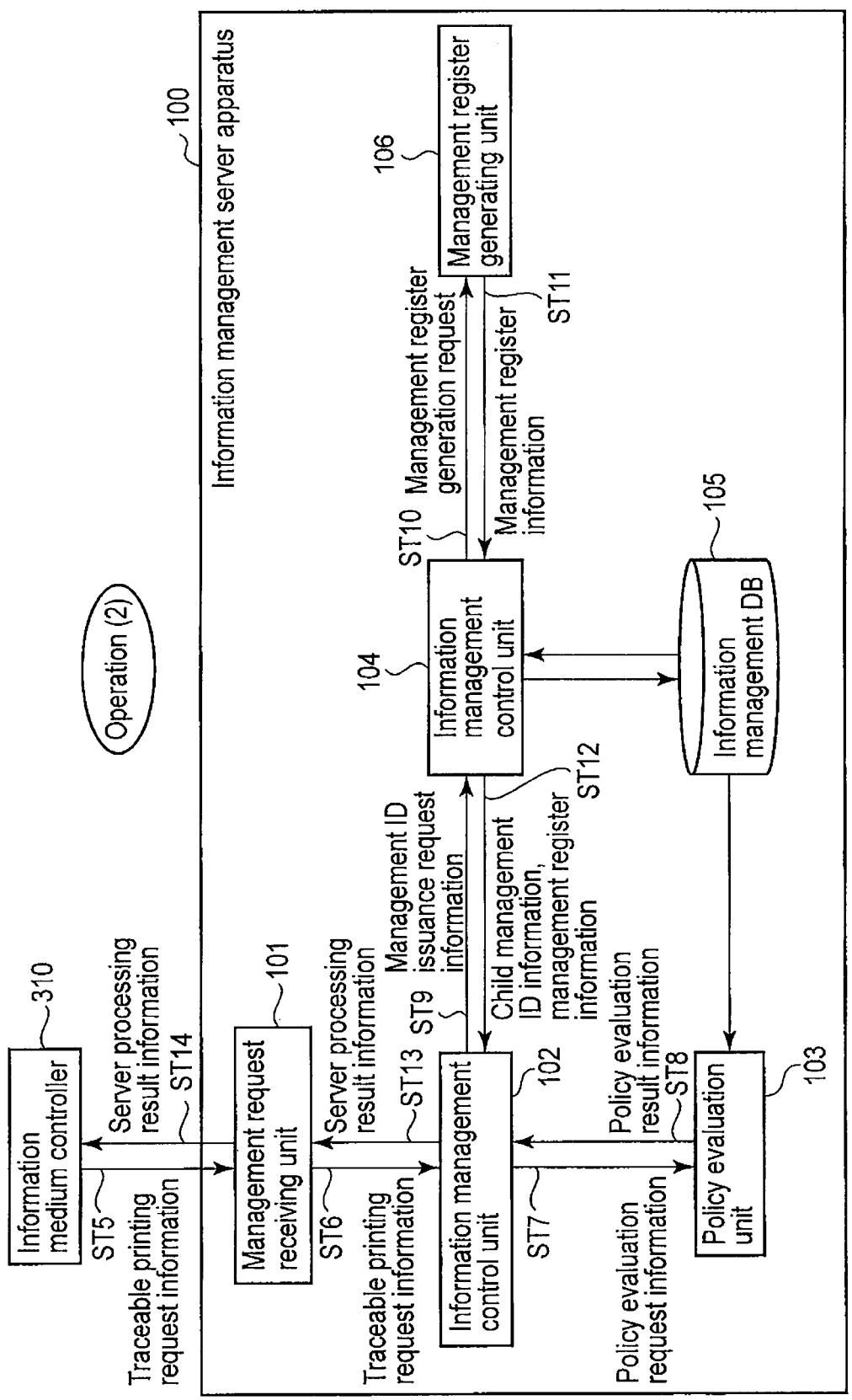
F I G. 16

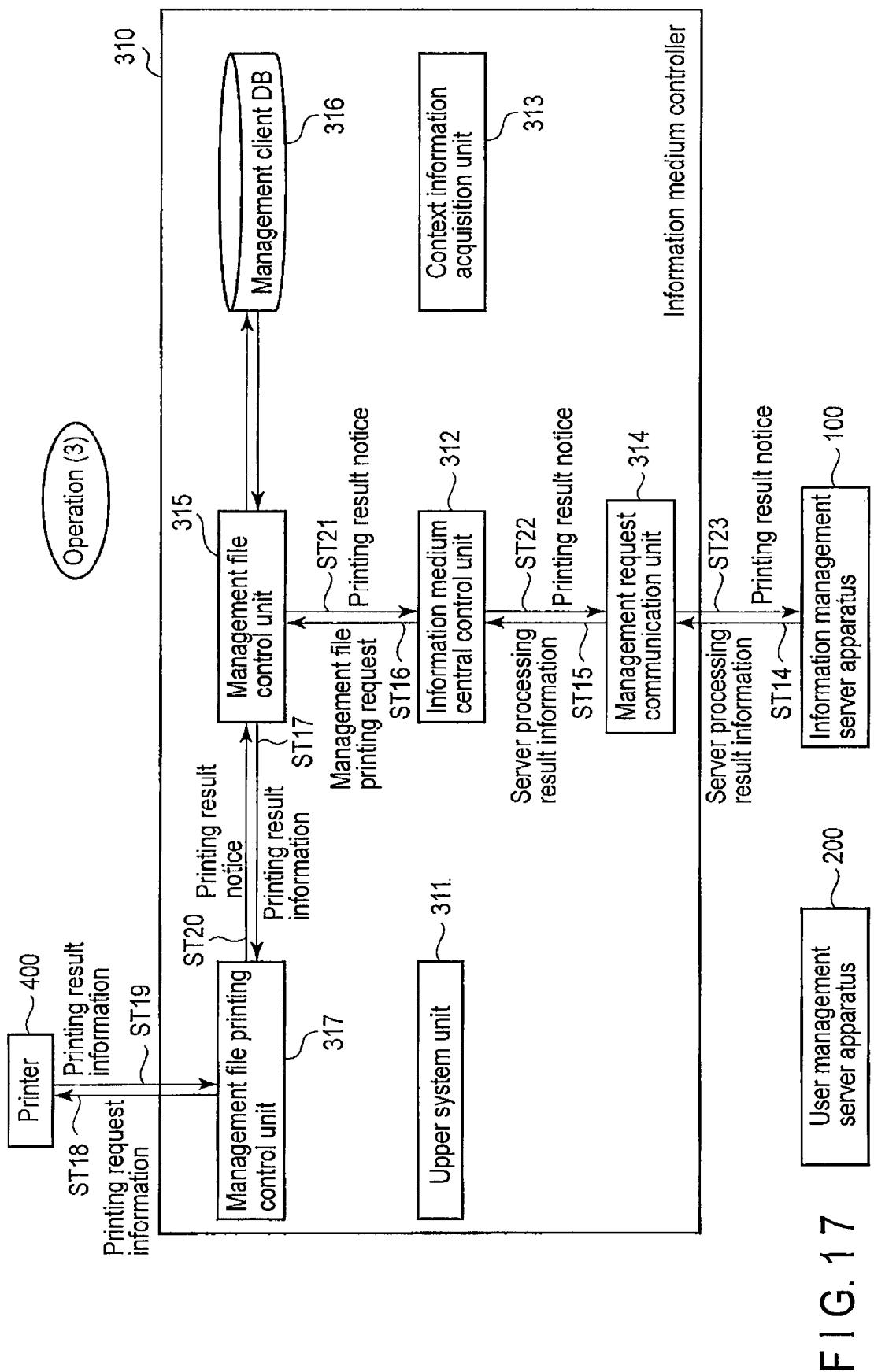
F I G. 17

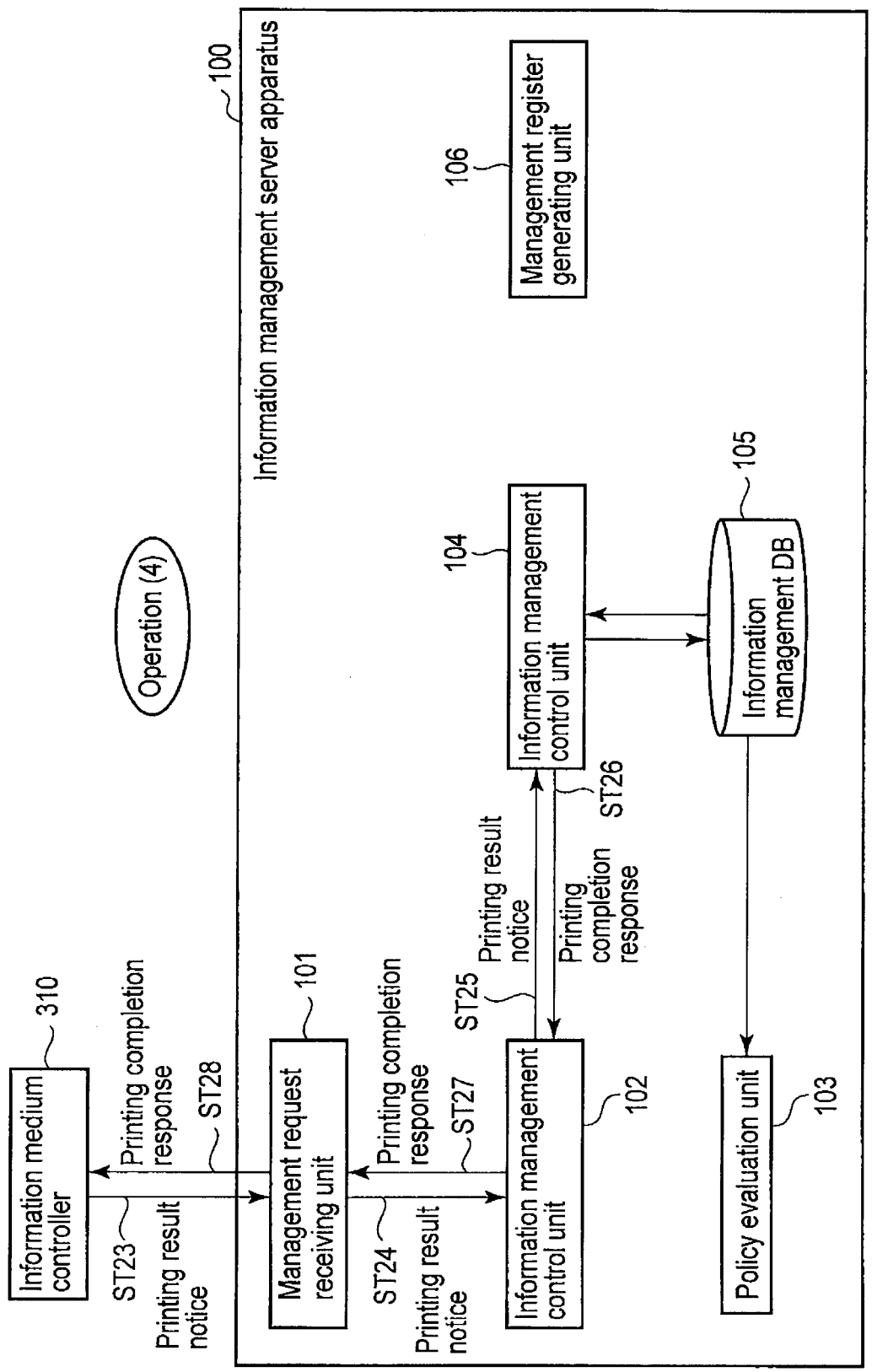
F I G. 18

G10

Important document management – printing screen      Log-in: Saburo ○△ Manager

Management file list

1000101 Client A contract
1001102 Client B contract
1001113 Product X design drawings
1002104 Important client list
⋮

Taro ○△ President
Jiro ○△ Vice president
Saburo ○△ Manager
Shiro ○△ Manager
Goro ○△ Clerk
⋮

☑ Output management register

[Print]

FIG. 21 dc1 — Important client list
Management ID : #1001301
2009/02/1 10:54
Jiro ○△ Vice president dc2 — Management ID : #1001401
2009/02/1 10:55
Goro ○△ Clerk dc3 — Management ID : #1001501
2009/02/1 10:56
Rokuro ○△ Clerk

FIG. 22

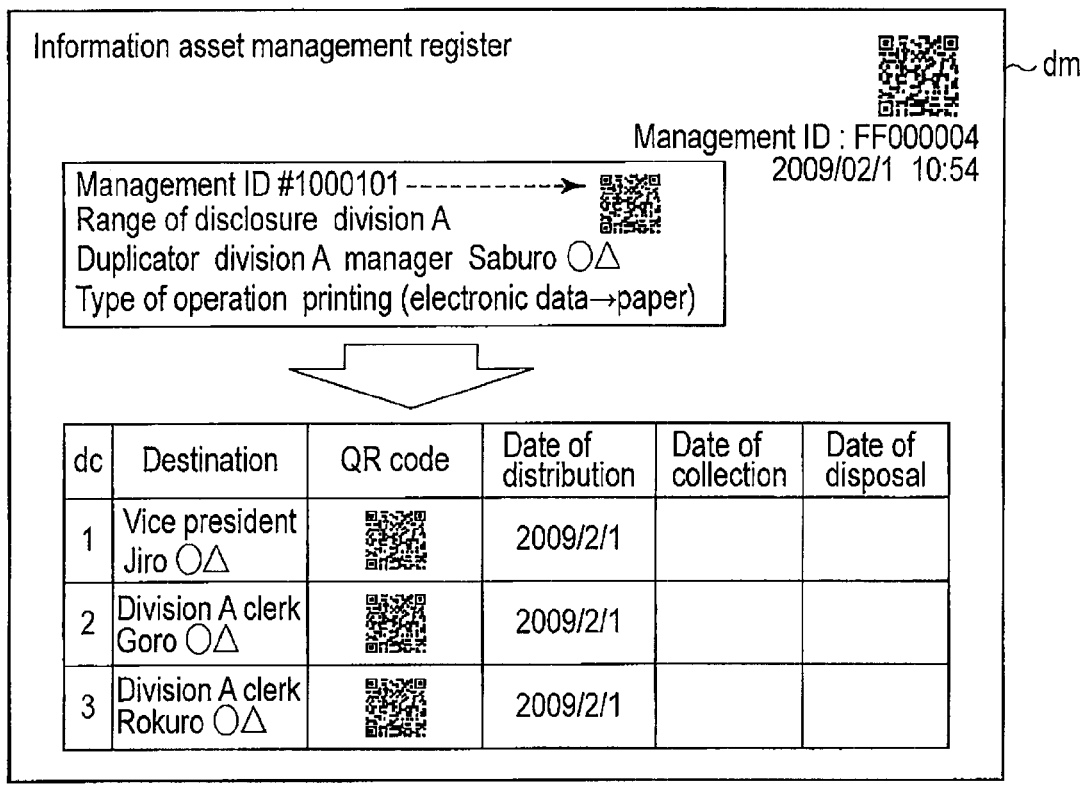
F I G. 2 3
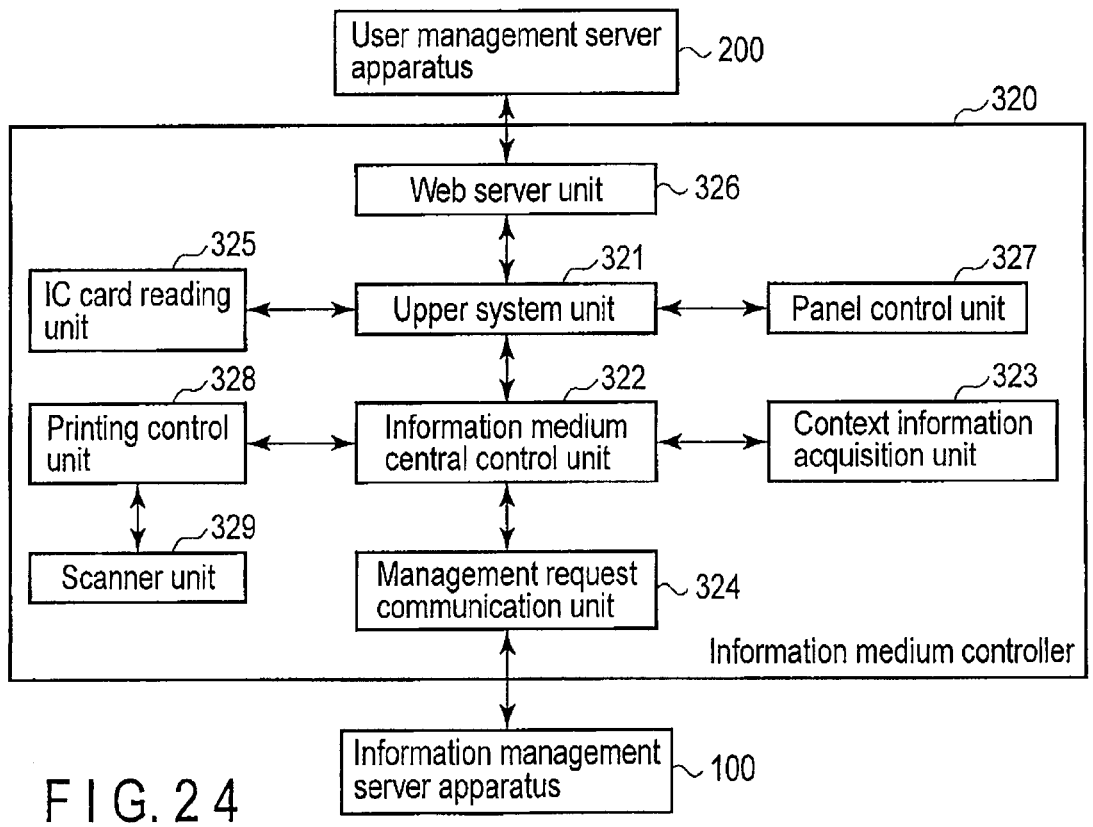
F I G. 2 4

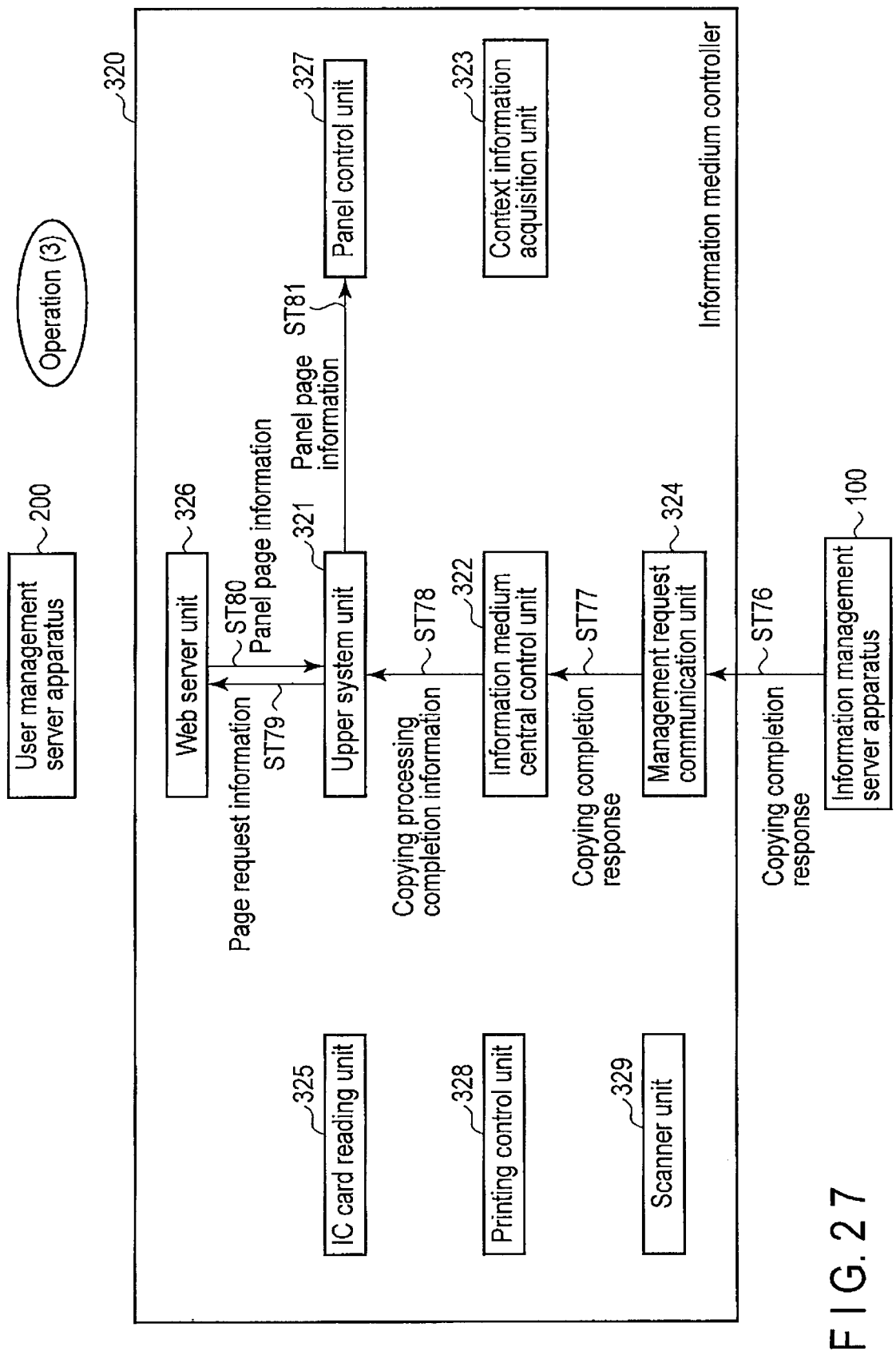
F I G. 27

DOCUMENT MANAGEMENT SUPPORT SYSTEM INCLUDING INFORMATION MEDIUM CONTROLLERS THAT COMMUNICATE WITH AN INFORMATION MANAGEMENT SERVER

CROSS REFERENCE TO RELATED APPLICATIONS

This application is a Continuation Application of PCT Application No. PCT/JP2010/058961, filed May 27, 2010 and based upon and claiming the benefit of priority from prior Japanese Patent Application No. 2009-130382, filed May 29, 2009, the entire contents of all of which are incorporated herein by reference.

BACKGROUND OF THE INVENTION

1. Field of the Invention

Embodiments according to the present invention relate to a document management support system, an information management server apparatus, and an information medium controller.

2. Description of the Related Art

For example, the following four techniques have been known as techniques for managing documents.

A workflow management system has been suggested as the first technique. This system assigns IC tags including identification information to documents, and reads the IC tags at the point of processing the documents, thereby managing the process.

A document management system has been suggested as the second technique. This system uses a digital multi-function device to convert, to image data, documents that have bar codes including identification information affixed to their covers, and manages the image data on a database, thereby enabling faster document searching.

A collection management system has been suggested as the third technique. This system affixes identification numbers to collections, and manages arrival information, dismantlement information, and shipment information.

A document management system has been suggested as the fourth technique. This system affixes identifiers to documents, and when a destination confirms reception, reports reception confirmation by communication means such as email.

However, the first to fourth techniques do not suggest the management of the life cycles of documents together with the restriction of duplication of documents.

BRIEF DESCRIPTION OF THE SEVERAL VIEWS OF THE DRAWINGS

FIG. 5 is a schematic diagram showing the configuration of a document management support system according to the first embodiment;

FIG. 6 is a schematic diagram showing the configuration of an information management DB according to the embodiment;

FIG. 7 is a schematic diagram showing the configuration of a management ID table according to the embodiment;

FIG. 9 is a schematic diagram showing the configuration of an access log management table according to the embodiment;

FIG. 10 is a schematic diagram showing the configuration of a master policy table according to the embodiment;

FIG. 11 is a schematic diagram showing the configuration of a client management table according to the embodiment;

FIG. 12 is a schematic diagram showing the configuration of a data original management table according to the embodiment;

FIG. 13 is a schematic diagram showing the configuration of a user management DB according to the embodiment;

FIG. 14 is a schematic diagram showing the configuration of a management client DB according to the embodiment;

FIG. 15 is a schematic diagram for explaining the operation according to the embodiment;

FIG. 16 is a schematic diagram for explaining the operation according to the embodiment;

FIG. 17 is a schematic diagram for explaining the operation according to the embodiment;

FIG. 18 is a schematic diagram for explaining the operation according to the embodiment;

FIG. 21 is a schematic diagram showing a configuration example of a printing screen according to the embodiment;

FIG. 22 is a schematic diagram showing configuration examples of duplicate documents according to the embodiment;

FIG. 23 is a schematic diagram showing a configuration example of an information asset management register according to the embodiment;

FIG. 24 is a schematic diagram showing the configuration of a document management support system according to the second embodiment;

FIG. 27 is a schematic diagram for explaining the operation according to the embodiment;

DETAILED DESCRIPTION OF THE INVENTION

Figure 1:
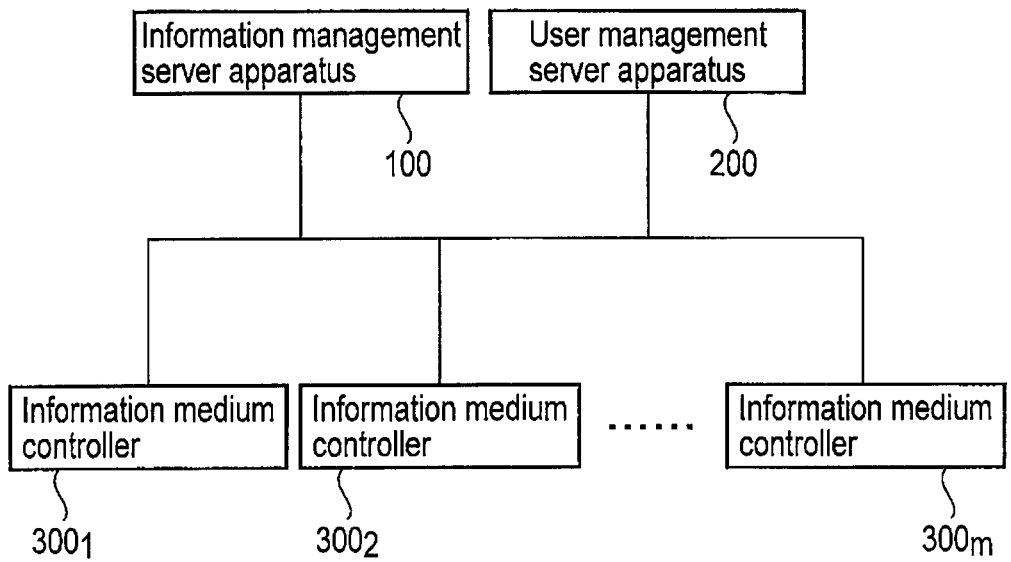
FIG. 1 is a schematic diagram showing the configuration of a document management support system according to embodiments.

According to one embodiment, a document management support system comprises information medium controllers that are configured to communicate with one another, and an information management server apparatus. Each of the information medium controllers comprises an upper system unit, an information medium central control unit, a management request communication unit, a management file control unit, a management client DB, and a management file printing control unit. The information management server apparatus comprises a management request receiving unit, a policy evaluation unit, an information management control unit, an information management DB, and a management register generating unit.

The information management DB of the information medium controller stores a management file management table into which a management file including a management ID and an electronic data body is written.

The information management DB of the information management server apparatus stores a systematic management table. Written into the systematic management table are, for each management ID of the management file, a child management ID and status information associated with the management ID, and an access control policy based on duplication requester information and destination information.

The information management DB of the information management server apparatus stores a master policy table that includes a permission policy based on address information for the information medium controller.

The upper system unit of the information medium controller receives the management ID corresponding to the electronic data body to be duplicated, and receives the duplication requester information and the destination information. The upper system unit also sends duplication request information including the received management ID, duplication requester, and destination information.

The information medium central control unit and the management request communication unit transmit, to the information management server apparatus, traceable duplication request information including the sent duplication request information and the address information for the information medium controller.

The policy evaluation unit of the information management server apparatus judges whether the duplication requester information and the destination information in the traceable duplication request information received from the management request communication unit of the information medium controller satisfy the access control policy in the systematic management table corresponding to the management ID in the traceable duplication request information.

The policy evaluation unit judges whether the address information in the received traceable duplication request information satisfies the permission policy.

When the access control policy and the permission policy are judged by the policy evaluation unit to be satisfied, the information management control unit issues a child management ID different from the management ID in the received traceable duplication request information, and writes this child management ID into the systematic management table on the basis of the management ID in the traceable duplication request information, and also updates the status information corresponding to the written child management ID to "distributed".

The management register generating unit, the information management control unit, and the management request receiving unit create management register information that includes a child management ID tag indicating the issued child management ID, the management ID in the traceable duplication request information, and the destination information, and transmit processing result information that includes the management register information to the information medium controller which is the transmission source of the traceable duplication request information.

After transmitting the traceable duplication request information, the management request communication unit of the information medium controller receives, from the information management server apparatus, the processing result information that includes the management ID in the traceable duplication request information, a child management ID tag indicating a child management ID different from the management ID, and the management register information comprising the destination information.

The management file control unit and the management file printing control unit extract the electronic data body from the management file on the basis of the management ID corresponding to the electronic data body to be duplicated, create document print data that includes the extracted electronic data body, and the child management ID tag and the destination information included in the processing result information and also create management register print data including the management register information, and then output the document print data and the management register print data.

When a paper document printed by the output document print data is collected after being distributed and then the child management ID indicated by the child management ID tag is read from the paper document by an exclusive reader, the upper system unit, the information medium central control unit, and the management request communication unit make a collection completion update request including the read child management ID, and transmit the collection completion update request to the information management server apparatus.

The information management control unit of the information management server apparatus updates the status information to "collected" on the basis of the child management ID in the collection completion update request received from a management request transmitting unit of the information medium controller.

Now, embodiments will be described with reference to the drawings. Each apparatus in the embodiments can be obtained by a hardware configuration or by a combinational configuration of a hardware resource and software. A program used as the software of the combinational configuration is installed in advance in a computer of a corresponding apparatus from a network or a storage medium, and enables the function of the corresponding apparatus.

Figure 2:
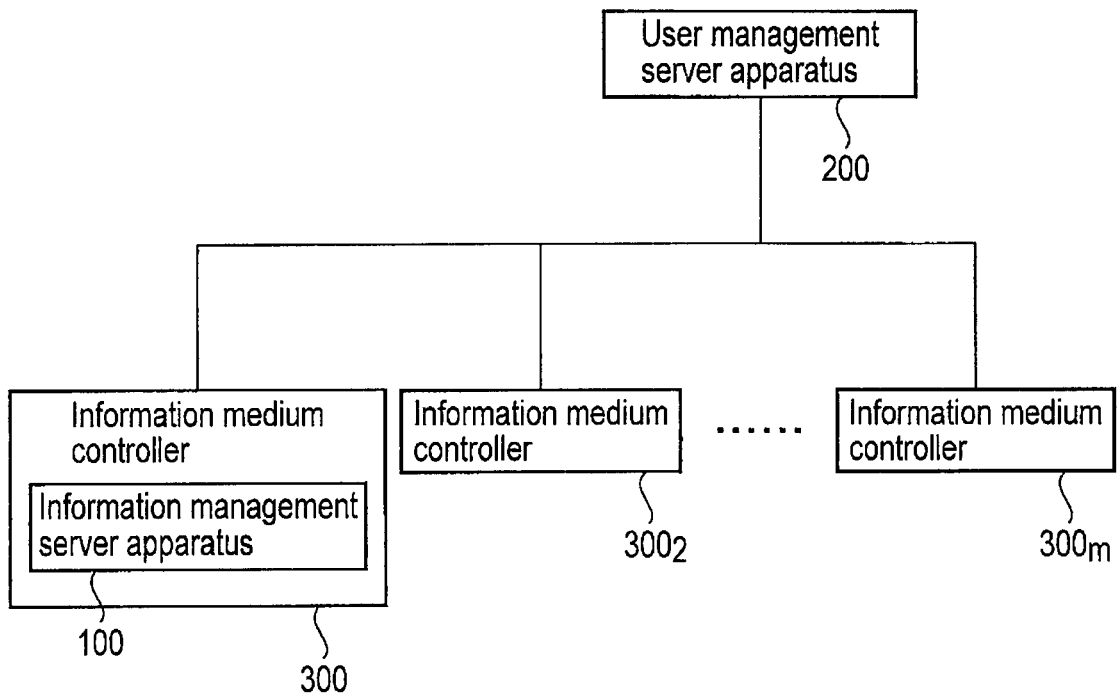
FIG. 2 is a schematic diagram showing a modification of the embodiments.
Figure 3:
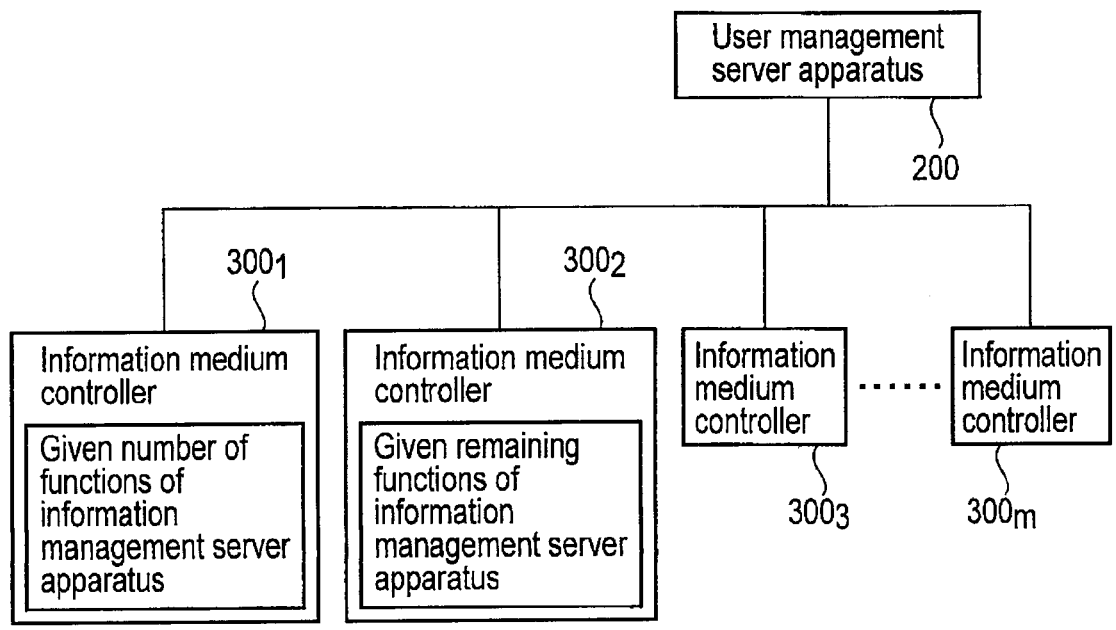
FIG. 3 is a schematic diagram showing another modification of the embodiments.

First, prerequisite terms and an overview of the document management support system according to each embodiment are described. FIG. 1 is a schematic diagram showing the configuration of a document management support system according to the embodiments. This document management support system comprises an information management server apparatus 100, a user management server apparatus 200, and information medium controllers $300_1$ to $300_m$ that are configured to communicate with one another. The information management server apparatus 100 performs unified systematic management of information media. The user management server apparatus 200 performs unified management of information regarding users. The information medium controllers $300_1$ to $300_m$ use the information media that are under the unified systematic management. Here, a given information medium controller among the information medium controllers $300_1$ to $300_m$ is represented by an "information medium controller 300". Although one information management server apparatus 100 and the m information medium controllers $300_1$ to $300_m$ are referred to as separate apparatuses for convenience of explanation, the present invention is not limited thereto. As shown in FIG. 2, one given information medium controller 300 may comprise the information management server apparatus 100. Alternatively, as shown in FIG. 3, two or more and m or less i information medium controllers 300 may respectively take charge of and perform n functions (however, i≦n) of the information management server apparatus 100. In a modification shown in FIG. 3, one function of the information management server apparatus 100 may be allocated to each of the i information medium controllers 300 (when i=n). Alternatively, two or more functions of the information management server apparatus 100 may be allocated to at least one of the i information medium controllers 300 (when i<n). When F functional blocks (e.g., units 101 to 106 in FIG. 5) less than n are dispersed in the information management server apparatus 100 having n functions, i information medium controllers 300 may take charge of performing the F functional blocks (however, i≦F). When i=F and when i<F, the "functions" for i=n and for i<n can be read as the "functional blocks". In summary, FIG. 3 shows that n functions or F functional blocks of the information management server apparatus 100 may be allocated to i information medium controllers 300 in accordance with the relation 2≦i≦F<n.

The user management server apparatus 200 comprises a user management DB in which user information such as the name, position, and post of a user is written in association with user ID information of the user, and a function of transmitting, to the information medium controllers 300, the user information associated with the user ID information in response to a user information request that includes user ID information.

Here, the information medium means "a medium retaining information" such as electronic data or a physical medium (e.g., a paper medium or a recording medium). As the recording medium, it is possible to use, for example, a CD-ROM, a DVD, an SD card, or a floppy disk. Accordingly, the information medium controllers $300_1$ to $300_m$ can be obtained by any apparatuses to which the electronic data can be input, such as a mobile telephone, a personal computer (PC), a digital multi-function device, a printer, a copier, a scanner, a shredder, a microfilm reader, a DVD reader, and a multiple drive, depending on the information medium to be used. The information medium controllers $300_1$ to $300_m$ operate in cooperation with the information management server apparatus 100.

Such a document management support system assigns the above-mentioned unique management identification (ID) for the individual identification of the information medium, and on the basis of the management ID, links, with information original, the creation and disposal of the information medium, the correlation (a system and the type of medium), and the status of the use of the medium, thereby achieving the unified systematic management.

When the information medium is electronic data, the document management support system converts the electronic data to an electronic file in a file format including a management ID. The converted electronic file is referred to as a management file.

Figure 4:
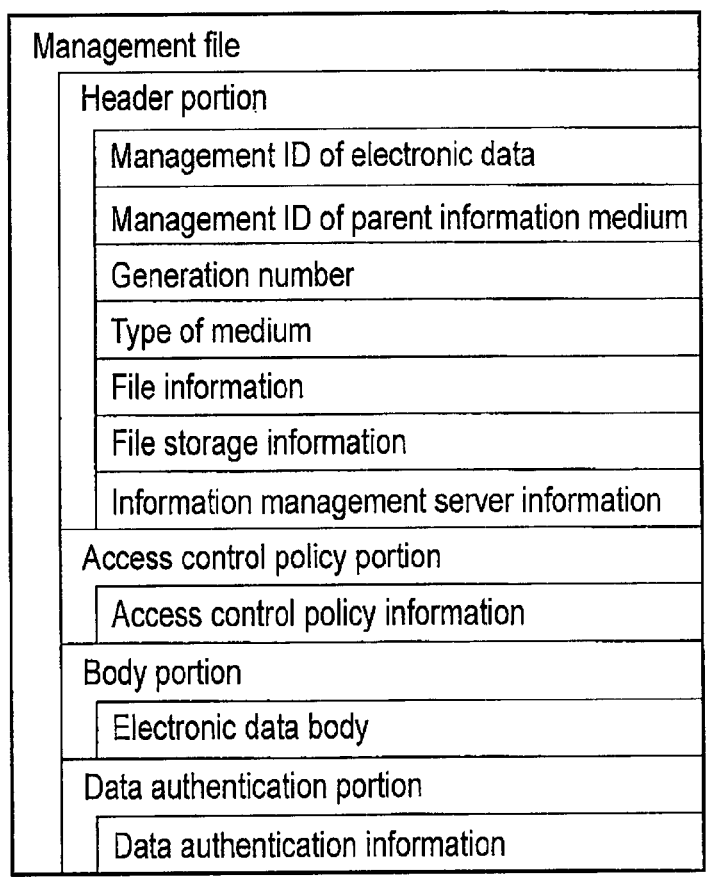
FIG. 4 is a schematic diagram showing a configuration example of a management file according to the embodiments.

The management file includes, in addition to the electronic data body of target information, header information including the management ID and attribute information, an access control policy, and authentication information for this management file. As shown in the configuration example in FIG. 4, the management file comprises a header portion, an access control policy portion, a body portion, and data authentication portion.

The header portion comprises a management ID of the electronic data, a management ID of a parent information medium, a generation number, the type of medium, file information, file storage information, and information management server information. However, the header portion is not limited to this configuration.

A management ID used as the management ID of the parent information medium is, for example, a management ID of original electronic data when electronic data is copied, a management ID of original electronic data when electronic data is printed and a paper medium is output, or a management ID assigned to a paper medium when the paper medium is converted to electronic data by a scanner.

The generation number is a generation numerical value indicating the generation of the management file in the system relation that manages the parents, children, and grandchildren thereof, originating from a management file that has been registered first in this management system. For example, if the generation number of a parent management file is 1, the generation number of a child information medium which is a duplication of the parent management file is 2, and the generation number of a grandchild information medium which is a duplication of the child management file is 3. However, the generation numbers are not exclusively represented in this form.

The file information includes the file format of the electronic data, a file size, information on the creator of the electronic data, creation date information, and creation place information.

The file storage information includes information that indicates whether the electronic data body stored in the body portion is encrypted. When the electronic data body is encrypted, the file storage information further includes its cryptographic algorithm, cryptographic key, and cryptographic module.

The information management server information is used to verify a MAC address and an IP address of the information management server, URI, and an authentication data portion. Cryptographic key information, and an cryptographic key certificate for this key may be stored as information to verify the authentication data portion.

Use control policy information regarding use restrictions is stored in the access control policy portion. Described in the access control policy information is the processing of the electronic file to be permitted or forbidden with regard to use conditions of the electronic data, for example, the expiration date for the use of the electronic file, information on a disclosure range such as a place or organization where the electronic file can be used, a network environment, information on the user or available devices, and the number of times of use.

The electronic data, or encrypted data obtained by encrypting the electronic data is stored in the body portion.

Authentication data information obtained from the header portion, the access control policy portion, and the body portion that are encrypted by the information management server apparatus is stored in the data authentication portion. Available as data authentication information is an digital signature that uses public key cryptosystem such as a digital signature algorithm (DSA), a Rivest-Shamir-Aldleman scheme (RSA), or elliptic curve DSA (ECDSA), or message authentication code (MAC) that uses a hash function or symmetric key cryptosystem.

The prerequisite terms and the overview of the system according to each embodiment have been described above. The name "document management support system" that represents the above-described system may be suitably changed to, for example, an "information life cycle system", a "material collection support system", a "material distribution support system", or a "document distribution/collection support system". Moreover, the terms "information", "document", and "material" in the names are replaceable. The embodiments of such a document management support system are described below in order.

First Embodiment

FIG. 5 is a schematic diagram showing the configuration of a document management support system according to the first embodiment. Of the configuration shown in FIG. 1, one information management server apparatus 100 and a given one information medium controller 300 are shown. In the present embodiment, a device in the information medium controller 300 including a personal computer (PC) or a mobile terminal that has the function of printing, through a high-order application, a management file managed in the information medium controller is treated as an information medium controller 310.

Here, the information management server apparatus 100 comprises a management request receiving unit 101, an information management control unit 102, a policy evaluation unit 103, an information management control unit 104, an information management DB 105, and a management register generating unit 106.

When, for example, received information is sent as it is, the units may be suitably combined together or eliminated. For example, the management request receiving unit 101 and the information management control unit 102 may be combined together or eliminated when received information is sent as it is. Also in other apparatuses and in the embodiments described below, units may be suitably combined together or eliminated when received information is sent as it is.

Here, the management request receiving unit 101, the information management control unit 102, the policy evaluation unit 103, the information management control unit 104, and the management register generating unit 106 are, for example, functional blocks that are obtained when an unshown CPU performs a program including later-described steps in the information management server apparatus 100.

Here, the program including the later-described steps in the information management server apparatus 100 has only to enable, for example, the following functions (a1) to (a7). Here, the functions (a1) to (a7) are used together with given additional matters such as various information and functions of the respective steps that are added to the functions (a1) to (a7) if desired. However, the following functions (a1) to (a7) are exemplary, and therefore include some given additional matters. For example, a second judgment function of (a4) and the associated address information can be eliminated if the standard of strictness in document management by a policy is decreased. A child management ID tag that indicates a child management ID can be eliminated by using the child management ID as it is.

(a1) A function of writing a systematic management table 1052 into the information management DB 105. Written into the systematic management table 1052 are, for each management ID of the management file, a child management ID and status information associated with the management ID, and an access control policy based on duplication requester information and destination information.

(a2) A function of writing a permission policy based on address information for the information medium controller 300 into a master policy table 1054 of the information management DB 105.

(a3) A first judgment function of judging whether the duplication requester information and the destination information in traceable duplication request information received from the information medium controller 300 satisfy the access control policy in the systematic management table 1052 corresponding to the management ID in the traceable duplication request information.

(a4) A second judgment function of judging whether the address information in the received traceable duplication request information satisfies the permission policy.

(a5) A function of, when the access control policy and the permission policy are judged by the first and second judgment functions to be satisfied, issuing a child management ID different from the management ID in the received traceable duplication request information, and writing this child management ID into the systematic management table 1052 on the basis of the management ID in the traceable duplication request information, and also updating the status information corresponding to the written child management ID to "distributed".

(a6) A function of creating management register information that includes a child management ID tag indicating the issued child management ID, the management ID in the traceable duplication request information, and the destination information, and transmitting processing result information that includes the management register information to the information medium controller which is the transmission source of the traceable duplication request information.

(a7) A function of updating the status information in the systematic management table 1052 to "collected" on the basis of the child management ID in the collection completion update request received from the information medium controller 300.

When the functions of the information management server apparatus 100 are allocated to the information medium controllers 300 as shown in FIG. 3, the following modification can be made, for example. That is, two or more of the information medium controllers 300 may be used instead of the information management server apparatus 100. For example, when seven information medium controllers are used, means for enabling the functions (a1) to (a7) provided in the information management server apparatus 100 may be dispersed in any two or more and seven or less information medium controllers 300.

That is, when seven information medium controllers 300 are used, any one of the functions (a1) to (a7) is provided in each of the information medium controllers 300. When two information medium controllers 300 are used, one to six of the functions (a1) to (a7) are provided in some of the information medium controllers 300, and the remaining six to one of the functions (a1) to (a7) are provided in the other information medium controllers 300. When three to six information medium controllers 300 are used, the functions (a1) to (a7) are dispersed in the information medium controllers 300 in the same manner.

The information management DB 105 can be obtained as a storage device readable/writable from the unshown CPU. As shown in FIG. 6, the information management DB 105 stores a management ID table 1051, the systematic management table 1052, an access log management table 1053, the master policy table 1054, a client management table 1055, and a data original management table 1056.

As shown in FIG. 7, the management ID table 1051 stores the issued management ID, the date of issuance, and issuance request source information in association with one another, and when the management ID has expired, further stores the date of expiration and expired request source information.

Figure 8:
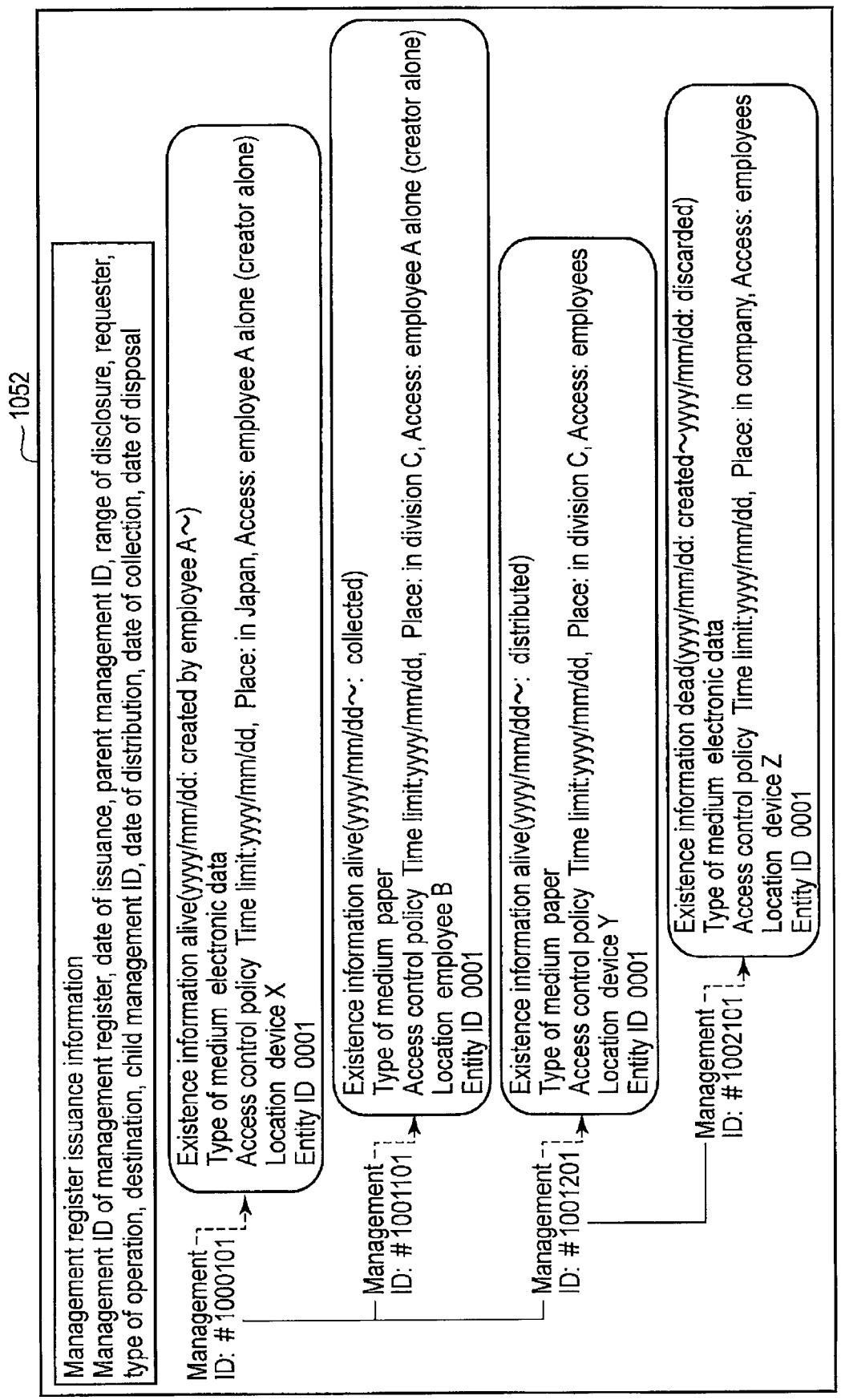
FIG. 8 is a schematic diagram showing the configuration of a systematic management table according to the embodiment.
Figure 19:
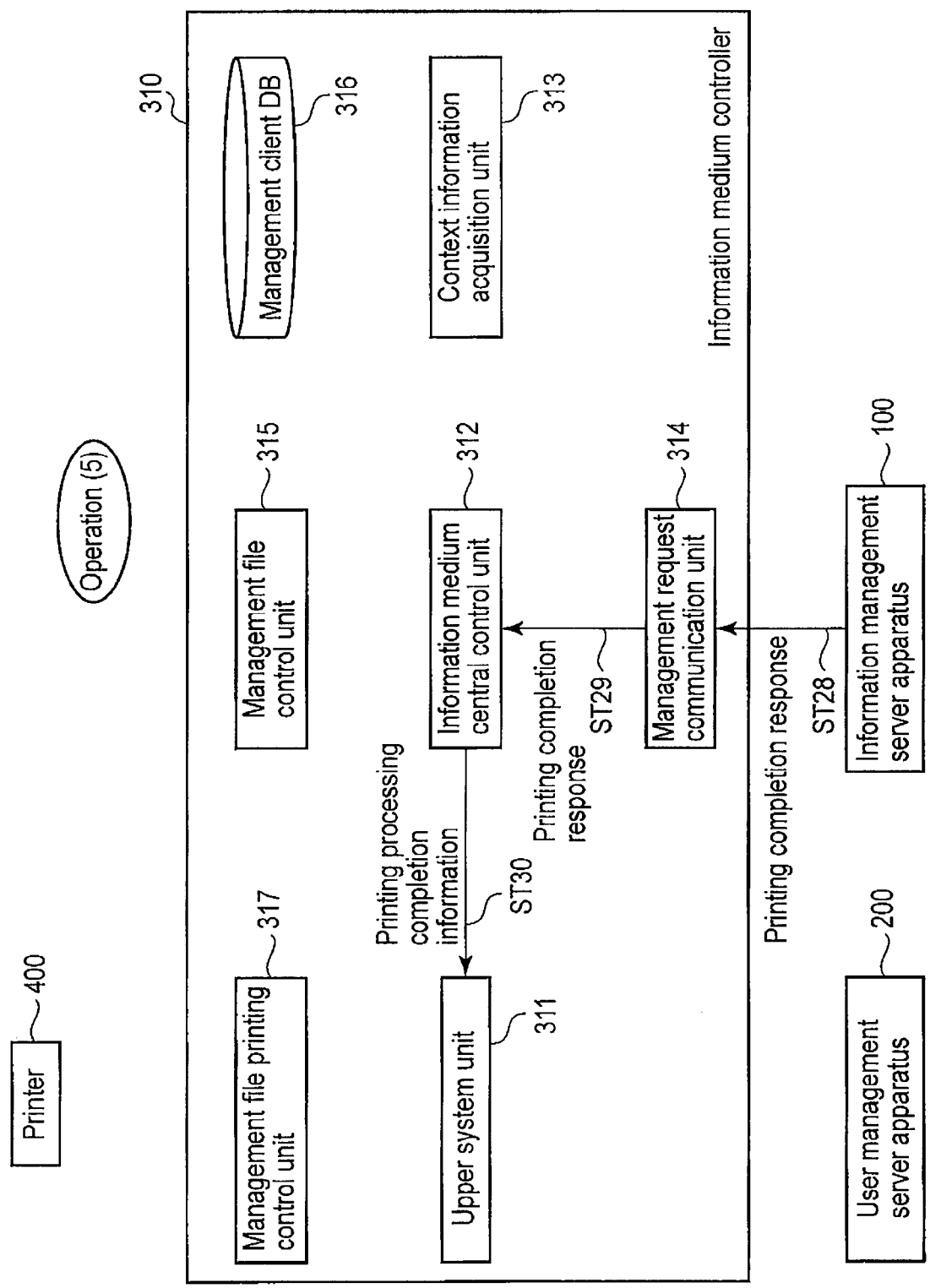
FIG. 19 is a schematic diagram for explaining the operation according to the embodiment.

As shown in FIG. 8, the systematic management table 1052 stores management register issuance information and electronic data body systematic management information. The management register issuance information includes a management ID of a management register.

The following are stored in association with one another as the electronic data body systematic management information: a management ID corresponding to the parent-child relation of an electronic data body, existence information (existing (alive), disappeared (dead), and the date of creation of the electronic data body and the date of disappearance), status information (current conditions during existence (alive) (distributed, collected), conditions (discarded, broken) at the time of disappearance (dead)), user information, type of medium, an access control policy (time limit, place (destination for which distribution is permitted), and access (a duplication requester for which duplication is permitted), location information, and entity identification. In the case of duplication, the following are stored, in association with one another, in the electronic data body of a duplication source (parent) or in the management ID of the management file: a management ID newly issued for duplication, creation date information in a header portion of the management file of a duplication (child), user information, type of medium, an access control policy, location information, and entity identification.

Here, serial numbers may be used as the system of issuance numbers of the management IDs as long as uniqueness in the system is ensured and the parent-child relation of duplications are managed to be linked with the management IDs. Each management ID may be issued so that its configuration is meant to clarify the parent-child relation of the management IDs. This can be achieved, for example, by using a value of a particular digit as a parent-child relation value.

In the example of FIG. 8, the fourth digit is the parent-child relation value. "0" indicates the uppermost parent, "1" indicates the child of this parent, and "2" indicates the child of the former child (=the grandchild of the parent). The third digit represents the type of medium. "1" indicates electronic data, "2" indicates a paper medium, and "3" indicates a recording medium. The first and second digits are identification numbers in the same generation and the same type of medium. The fifth to eighth digits (# and values of three digits on the right of #) represent an electronic data ID. Management files having the same electronic data ID include the same electronic data regardless of their parents. Devices X, Y, and Z and an employee B, for example, in the location information correspond to any one of the information medium controllers 310x, 310y, 310z, and 310B, and may therefore be read as the information medium controllers 310x, 310y, 310z, and 310B. No management file is created for the uppermost parent indicated by the parent-child relation value "0". A management file is created for the parent indicated by the parent-child relation value "1" or more. The entity ID is the information for identifying the electronic data body (data original). When electronic data is duplicated, the entity ID of a duplication source (parent) is the same as the entity ID of a duplication (child), in contrast with the above-mentioned management ID.

As shown in FIG. 9, the access log management table 1053 includes, for each date of operation, a client ID, the type of operation, a management ID, and a processing status. The client ID is an ID that indicates an employee who has performed an operation, and may be read as an operator ID or an employee ID. The type of operation indicates the type of operation such as log-in status, initial registration, duplication of electronic data, viewing, and erasing. The management ID is the management ID that indicates the manipulated electronic data. The processing status is the status information that indicates a processing result, for example, the success or failure (e.g., an authentication error) of the processing indicated by the type of operation. The contents managed in the access log management table 1053 are not limited to the information shown in FIG. 9, and information (inside or outside the company, GPS information) on the place of the device which has manipulated a target management file may be additionally included.

As shown in FIG. 10, the master policy table 1054 stores, for each policy number, the type of policy and a rejection/permission policy in association with each other. The policy number is the identification information for a policy, and may be read as a policy ID. The type of policy is the information that indicates the type of target to be controlled by the rejection/permission policy. For example, location control, time control, and permission control can be suitably used. The rejection/permission policy is the information that indicates a judgment condition, and the contents of control when the judgment condition is satisfied. The control contents include a target (e.g., a command or request) to be permitted or rejected, and may also include processing such as in-company wired connection or in-company wireless connection.

As shown in FIG. 11, the client management table 1055 stores, in association with one another, a client ID, an employee number, an authority class, the type of terminal, and a MAC address. The client management table 1055 may also include information regarding the target information medium controller, such as OS information and device management number.

As shown in FIG. 12, the data original management table 1056 stores, in association with one another, an entity ID, a file name, a size, a hash value, an electronic data body, and external storage information. Here, the entity ID is the identification information for the electronic data body (data original). The file name is the file name of a management target data body (electronic data body) to be stored in the management file. The size is the file size of the management target data body to be stored in the management file. The hash value is the hash value of the management target data body to be stored in the management file. The electronic data body is the management target data body to be stored in the management file. The external storage information is, when the management target data body is saved outside the information management DB 105, information on where the management target data body is saved. In the present embodiment, as the information medium controller 310 is designated as the external storage information, the data original management table 1056 is not used. In contrast, when the external storage information is not used, the management target data body (electronic data body) is not saved in a management file entity of a management file management table 3161 in the information medium controller 310.

On the other hand, the user management server apparatus 200 comprises a user information request receiving unit 201 and a user management DB 202. The user information request receiving unit 201 is, for example, a functional block that is obtained when the unshown CPU performs a program including later-described steps in the user management server apparatus 200.

The user management DB 202 can be obtained as a storage device readable/writable from the unshown CPU. As shown in FIG. 13, the user management DB 202 stores a user management table 2021.

The user management table 2021 stores, for each user ID, a name, a position, and a post in association with one another.

On the other hand, the information medium controller 310 comprises an upper system unit 311, an information medium central control unit 312, a context information acquisition unit 313, a management request communication unit 314, a management file control unit 315, a management client DB 316, and a management file printing control unit 317.

The upper system unit 311, the information medium central control unit 312, the context information acquisition unit 313, the management request communication unit 314, the management file control unit 315, and the management file printing control unit 317 are, for example, functional blocks that are obtained when the unshown CPU performs a program including later-described steps in the information medium controller 310.

Here, the program including steps in the information medium controller 310 has only to enable, for example, the following functions (b1) to (b7). Here, the functions (b1) to (b7) are used together with given additional matters such as various information and functions of the respective steps that are added to the functions (b1) to (b7) if desired. However, the following functions (b1) to (b7) are exemplary, and therefore include some given additional matters. For example, the address information associated with the above-mentioned second judgment function of (a4) can be eliminated. A child management ID tag that indicates a child management ID can be eliminated by using the child management ID as it is.

(b1) A function of writing the management file including the management ID and the electronic data body into the management file management table 3161 of the management client DB 316.

(b2) A function of receiving a management ID, duplication requester information, and destination information corresponding to an electronic data body to be duplicated, and sending duplication request information including the received management ID, duplication requester, and destination information.

(b3) A function of transmitting, to the information management server apparatus 100, traceable duplication request information including the sent duplication request information and the address information for the information medium controller 310.

(b4) A function of receiving, from the information management server apparatus 100, processing result information that includes the management ID in the traceable duplication request information, a child management ID tag indicating a child management ID different from the management ID, and management register information comprising the destination information, after the traceable duplication request information is transmitted.

(b5) A function of extracting the electronic data body from the management file on the basis of the management ID which is included in the traceable duplication request information and which corresponds to the electronic data body to be duplicated, creating document print data that includes the extracted electronic data body, and the child management ID tag and the destination information included in the processing result information and also creating management register print data including the management register information, and then outputting the document print data and the management register print data to a printer 400.

(b6) A function of, when a paper document printed by the output document print data is collected after being distributed and then the child management ID indicated by the child management ID tag is read from the paper document by an exclusive reader (tag reading means) 500, making a collection completion update request including the read child management ID, and transmitting the collection completion update request to the information management server apparatus 100.

When the functions of the information management server apparatus 100 are provided in the information medium controllers 300 as shown in FIG. 2, the following modification can be made, for example. That is, the program including steps in the information medium controller 310 has only to enable, for example, the following functions (c1) to (c12). The functions (c1) to (c12) may be used together with given additional matters such as various information and functions of the respective steps that are added to the functions (c1) to (c12) if desired. However, the following functions (c1) to (c12) are exemplary, and therefore include some given additional matters, as in the case described above.

(c1) A function of writing, into the management client DB 316, the management file management table 3161 into which a management file including a management ID and an electronic data body is written.

(c2) A function of writing, into the systematic management table 1052 of the management client DB 316 for each management ID of the management file, a child management ID and status information associated with the management ID, and an access control policy based on duplication requester information and destination information.

(c3) A function of writing a permission policy based on address information for the information medium controller into the master policy table 1054 of the management client DB 316.

(c4) A function of receiving a management ID, duplication requester information, and destination information corresponding to an electronic data body to be duplicated, and sending duplication request information including the received management ID, duplication requester, and destination information.

(c5) A function of sending traceable duplication request information including the sent duplication request information and the address information for the information medium controller 300.

(c6) A first judgment function of judging whether the duplication requester information and the destination information in the sent traceable duplication request information satisfy the access control policy in the systematic management table 1052 corresponding to the management ID in the traceable duplication request information.

(c7) A second judgment function of judging whether the address information in the sent traceable duplication request information satisfies the permission policy.

(c8) A function of, when the access control policy and the permission policy are judged by the first and second judgment functions to be satisfied, issuing a child management ID different from the management ID in the sent traceable duplication request information, and writing this child management ID into the systematic management table 1052 on the basis of the management ID in the traceable duplication request information, and also updating the status information corresponding to the written child management ID to "distributed".

(c9) A function of creating management register information that includes a child management ID tag indicating the issued child management ID, the management ID in the traceable duplication request information, and the destination information, and sending processing result information that includes the management register information.

(c10) A function of extracting the electronic data body from the management file on the basis of the management ID included in the management register information in the sent processing result information, creating document print data that includes the extracted electronic data body, and the child management ID tag and the destination information in the management register information and also creating management register print data including the management register information, and then outputting the document print data and the management register print data to the printer 400.

(c11) A function of, when a paper document printed by the output document print data is collected after being distributed and then the child management ID indicated by the child management ID tag is read from the paper document by the exclusive reader (tag reading means) 500, making a collection completion update request including the read child management ID, and sending the collection completion update request.

(c12) A function of updating the status information to "collected" on the basis of the child management ID in the sent collection completion update request.

The management client DB 316 can be obtained as a storage device readable/writable from the unshown CPU. As shown in FIG. 14, the management client DB 316 stores the management file management table 3161 and an access log table 3162.

The management file management table 3161 includes, for each management ID, status information (e.g., now viewed, -(removed), available), management file attribute information (creation date information (alive), and removal date information when the management ID is removed (dead)), and management file entity. Here, partial information for a management file header portion (e.g., a management ID that indicates a management file (parent management file) of the duplication source of the management file in addition to the above-mentioned creation and removal date information) is used as the management file attribute information. However, the range of description in this information can be in various forms in accordance with the environmental setting of the device and regulations associated with the information management server apparatus. The management file attribute information may also include dynamic use information that is not described in the management file header portion, such as the number of accesses to each management file gained by the device.

The access log table 3162 includes, for each date of operation, the type of operation, a management ID, and a management file name. The type of operation indicates various types of operations such as log-in status, initial registration, duplication of electronic data, viewing, and erasing. The management ID is the management ID that indicates the manipulated electronic data. The management file name is, for example, information in which an extension indicating the file format of the electronic data is connected with the management ID of the electronic data. The contents managed in the access log table are not limited to the above-mentioned information, and information (inside or outside the company, GPS information) on the place of the device which has manipulated a target management file may be additionally included.

The printer 400 is one of the information medium controllers 300₁ to 300ₘ, and here, is used as an ordinary printer.

Now, the operation of the document management support system having such a configuration is described with reference to the schematic diagrams of FIG. 15 to FIG. 20. In the operation described here, a management file provided with a management ID and document destination information are specified so that print documents including child management IDs and destination information that vary by destination are output to the printer 400.

The upper system unit 311 of the information medium controller 310 presents a user a print screen G10 for selecting a management file, a destination, and whether to output a management register shown in FIG. 21 to make a printing request. At the same time, the upper system unit 311 properly asks the user information request receiving unit 201 of the user management server apparatus 200, acquires user information from the user management DB 202, and displays destination information. An identification tag including a child management ID for individual identification is provided to each duplicate document to be printed, and information such as the time of printing, the name of the destination, and the position is printed when needed. FIG. 22 shows configuration examples of duplicate documents dc1 to dc3. In the examples, an important client list is selected as the management file, and a QR code (registered trademark) is used as the identification tag. However, the management file and the identification tag are not limited to these examples. For example, the identification tag can be provided (printed or affixed) by a printer, and is not limited to the QR code as long as the identification tag is an optical tag or electronic tag in which a management ID can be stored. The identification tag may be in any form, for example, a bar code, a two-dimensional code, a color code, a watermark, or an RFID. The identification tag may also include, in addition to the management ID for use, a generation number, URL, a telephone number, and an email address.

This provides advantages such as smooth collection/disposal status changes. For example, the QR code is read by an image pickup device of a mobile telephone, and direct contact is made with a reference for the relevant information in accordance with a telephone number or an email address indicated in the mobile telephone. Alternatively, access is gained to the URL of a management Web site stored in the mobile telephone to acquire details of the relevant information.

Figure 20:
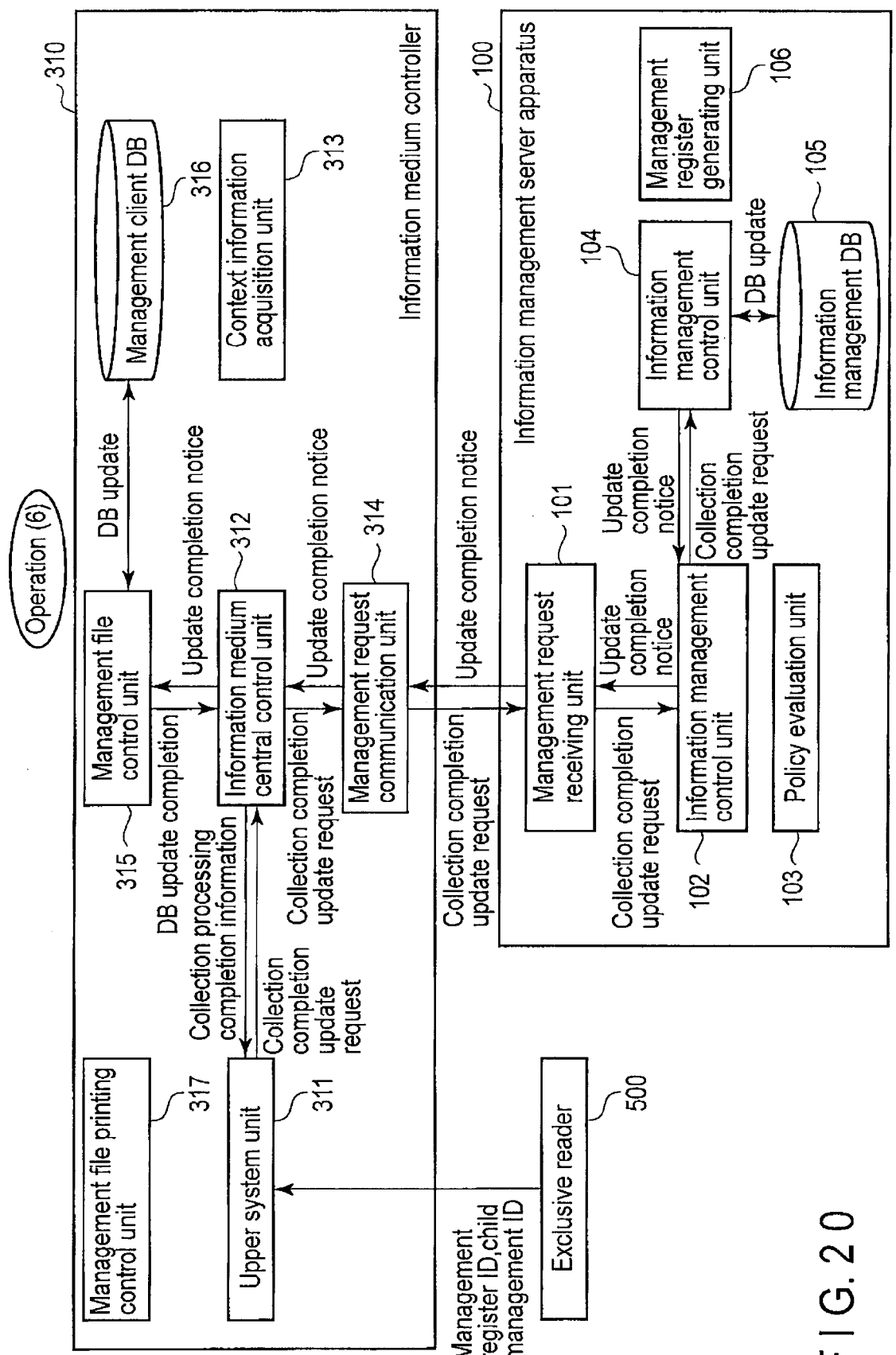
FIG. 20 is a schematic diagram for explaining the operation according to the embodiment.

This management Web site serves as the upper system unit 311 of FIG. 20 that accepts a collection/disposal request and transmits a collection completion update request to the information management server apparatus 100 (described later). The mobile telephone serves as the exclusive reader 500 described later, and emits the management ID to the upper system unit 311 (management Web site) through a mobile communication network.

For stricter collection management of output duplicate documents, an information asset management register can be printed together with the duplicate documents. FIG. 23 shows a configuration example of an information asset management register dm. The parent-child relation of information assets is shown in the information asset management register dm on the basis of management ID information for the original management file and each management ID (QR code) of the duplicate document. Moreover, information on the destinations of the duplicate documents dc1 . . . , the date of distribution, the date of collection, and the date of disposal can be described, and the management of the owners and management status of the duplicate documents is automated. Such an automation technique reduces labor and human errors resulting from manual work, and can provide advantageous effects including improved operational efficiency and reinforced compliance.

Now, details of the operation for printing the duplicate documents and the information asset management register are described.

The upper system unit 311 of the information medium controller 310 sends, to the information medium central control unit 312, printing request information that includes selected management file information (including a management ID corresponding to an electronic data body to be duplicated), requester information, destination information, and information on whether to output the management register (ST1). If whether to output the management register has been determined in advance in normal cases, the information on whether to output the management register may be only input in exceptional cases. That is, the information on whether to output the management register can be properly omitted. The printing request information may be read as duplication request information. The requester information may be read as duplication requester information.

On receipt of the printing request information, the information medium central control unit 312 sends, to the context information acquisition unit 313, a context information request for acquiring information on the information medium controller 310 when the request is made (ST2).

The context information acquisition unit 313 uses the function of an operating system to acquire, as context information, information such as the IP address of the information medium controller 310 that shows where and how the information medium controller 310 is used, and sends this information to the information medium central control unit 312 (ST3). When place or space information can be acquired by, for example, GPS, an infrared address, or a wireless node, this space information may be included in the information medium controller 310. Information such as a MAC address, the operating system, and terminal product information may also be included. The document management support system judges by the context information whether the specified management file is in a printable condition, and printing is performed in accordance with this judgment.

The information medium central control unit 312 sends, to the management request communication unit 314, traceable printing request information that includes the printing request information acquired from the upper system unit 311 and the context information acquired from the context information acquisition unit 313 (ST4). The traceable printing request information may be read as traceable duplication request information.

The management request communication unit 314 communicates with the information management server apparatus 100, and sends the traceable printing request information (ST5).

The management request receiving unit of the information management server apparatus 100 sends, to the information management control unit 102, the traceable printing request information acquired by the communication with the information medium controller 310 (ST6).

The information management control unit 102 selects, from the printing request information and the context information in the traceable printing request information, information necessary to judge whether to accept the printing request, and sends this information to the policy evaluation unit 103 as policy evaluation request information (ST7).

On the basis of the policy evaluation request information, the policy evaluation unit 103 judges whether the requested printing processing is in the range of execution conditions, by referring to the systematic management table 1052 and the master policy table 1054 of the information management DB 105 for the access control policy of the management file which is the duplication source. The policy evaluation unit 103 sends the judgment to the information management control unit 102 as policy evaluation result information (ST8). Judgment conditions include, by way of example, items such as whether the time limit of the use of the duplication is due, whether the information medium controller 310 uses wired LAN access rather than wireless LAN access, and whether the person is in a position to have a printing authority. For example, for policy numbers 001 to 003 in the master policy table 1054 shown in FIG. 10, whether the IP address in the context information satisfies the permission policy is judged. Moreover, for example, in the systematic management table 1054 shown in FIG. 8, whether the duplication requester information indicates an "employee A (creator)" is judged, and whether the access control policy is satisfied is judged by whether the destination information indicates "in division C". Any one of the judgments using the systematic management table 1052 and the master policy table 1054 may be made first. That is, policy judgments may be made in any order.

When the execution of printing is rejected by the policy evaluation result, the information management control unit 102 reports an execution authority error to the information medium controller 310 via the management request receiving unit 101, and terminates the processing. When the execution of printing is approved by the policy evaluation result, the information management control unit 102 sends management ID issuance request information including the traceable printing request information to the information management control unit 104, and requests the issuance of an ID for the duplicate document and the generation of a management register (ST9).

On receipt of the management ID issuance request information, the information management control unit 104 issues management IDs (which are child management IDs and different from the management IDs in the traceable printing request information) corresponding to the number of duplicate documents and also issues a management ID of the management register, and writes issuance information into the management ID table 1051 and the systematic management table 1052 of the information management DB 105. At the same time, the information management control unit 104 writes the issued child management IDs into the systematic management table 1052 in accordance with the management IDs in the traceable printing request information, and updates the status information in existence information corresponding to the written child management IDs to "distributed", thereby writing the issuance information. The information management control unit 104 also writes, into the systematic management table 1052, management register issuance information such as the management ID of the management register, the date of issuance, a parent management ID, the range of disclosure (the contents of the copied "part" in the access control policy of the parent management ID), the duplication requester, the type of operation, a destination, a child management ID, the date of distribution, the date of collection (blank), and the date of disposal (blank). The information management control unit 104 also writes log information for this printing request into the access log management table 1053. The information management control unit 104 sends a management register generation request including the issued management ID of the management register to the management register generating unit 106 (ST10).

In accordance with the management register generation request, the management register generating unit 106 creates management register information that includes a child management ID tag indicating the issued child management ID, the management ID in the traceable printing request information, and the destination information, and sends this information to the information management control unit 104 (ST11). Here, the child management ID is converted to a child management ID tag such as a bar code, a two-dimensional code, a watermark, or a color code to generate the child management ID tag including the child management ID and thereby create the management register information. However, the management register information is not exclusively created in this way. The management register information may be created without converting the child management ID to the child management ID tag. Moreover, the management register information not only includes the above-mentioned child management ID, the management ID in the traceable printing request information, and the destination information, but also includes here information such as the management ID of the management register, the date of issuance, the duplication requester information, and the type of operation, as shown in FIG. 20. If the management register information includes four kinds of information comprising the management ID of the management register, the management ID in the traceable printing request information, the child management ID (or the child management ID tag), and the destination information, documents can be easily managed.

The information management control unit 104 sends child management ID information including the child management ID issued for the duplicate document, and the management register information to the information management control unit 102 (ST12). The child management ID information can be omitted because the management register information includes the child management ID tag.

The information management control unit 102 sends, to the management request receiving unit 101, server processing result information that includes the policy evaluation result information, the child management ID information, and the management register information (ST13).

The management request receiving unit 101 sends the server processing result information to the information medium controller 310 (ST14).

The management request communication unit 314 sends, to the information medium central control unit 312, the server processing result information received from the information management server apparatus 100 (ST15).

The information medium central control unit 312 recognizes from the policy evaluation result information in the server processing result information that the printing processing can be executed, and sends, to the management file control unit 315, a management file printing request that includes duplication source management file information, the child management ID information, and the management register information (ST16). The policy evaluation result information and the processing for recognizing this information can be omitted because the server processing result information including the child management ID information and the management register information is received only when the policy evaluation result is "permit".

The management file control unit 315 acquires the management file entity from the management file management table 3161 of the management client DB 315 on the basis of the management ID included in the management file information in the management file printing request. The management file control unit 315 extracts the electronic data body stored in the body portion from the management file entity, and sends, to the management file printing control unit 317, printing processing information that includes the electronic data body, the child management ID information, and the management register information (ST17). Regarding a child management file, the management file control unit 315 writes, into the management file management table 3161, the child management ID, the status "distributed", and management file header portion information, and also writes, into the access log table 3162, the date, the type of operation "print", the child management ID, and the management file name.

The management file printing control unit 317 creates document print data that includes the electronic data body, the child management ID tag in the management register information, and the destination information, and management register print data that includes the management register information, and then outputs the document print data and the management register print data to the printer 400 (ST18). When the management register information includes not the child management ID tag but the child management ID, the print data is created by creating an optical code (child management ID tag) such as a bar code, a two-dimensional code, a color code, or a watermark from the child management ID in the management register information and overlaying (optical overwrite) the optical code on the print data in the electronic data body. In this case, when necessary, printing request date information and the destination information may be overlaid together with the optical tag. Document attribute information such as the printing request date information, the destination information, and the time limit of disposal may be stored in the optical tag.

The printer 400 executes the printing processing from the document print data for each duplicate document and the management register print data for the management register information, and as shown in FIG. 22 and FIG. 23, outputs paper documents for the duplicate documents dc1 to dc3 and the information asset management register dm. After completing the printing processing, the printer 400 sends printing result information to the management file printing control unit 317 (ST19). The printing result information may be sent after all the requested duplicate documents and the management register have been printed, or may be sent every time a copy of the duplicate documents and the management register is printed.

On receipt of the printing result information, the management file printing control unit 317 sends a printing result notice to the management file control unit 315 (ST20). The printing result notice may include printing information such as the date of output, the number of sheets, the type of paper, the type of printing including color or black-and-white printing, the number of pages per sheet, double-sided printing, and hidden printing.

The management file control unit 315 writes printing output result information into the access log table 3162 of the management client DB 316. After the completion of writing into the management client DB 316, the management file control unit 315 sends the printing result notice to the information medium central control unit 312 (ST21).

The information medium central control unit 312 sends the printing result notice to the management request communication unit 314 (ST22).

The management request communication unit 314 sends the printing result notice to the information management server apparatus 100 (ST23).

The management request receiving unit 101 sends, to the information management control unit 102, the printing completion notice received from the information medium controller 310 (ST24).

The information management control unit 102 sends the printing result notice to the information management control unit 104 (ST25).

The information management control unit 104 writes duplicate document information into the systematic management table 1052 of the information management DB 105. At the same time, the information management control unit 104 stores the parent-child relation, the type of medium, and location information such as destination information in the systematic management table 1052 as a child information medium duplicated from the management ID of the printing source management file. After the completion of writing into the information management DB 105, the information management control unit 104 sends a printing completion response to the information management control unit 102 (ST26).

The information management control unit 102 sends the printing completion response to the management request receiving unit 101 (ST27).

The management request receiving unit 101 sends the printing completion response to the information medium controller 310 (ST28).

The management request communication unit 314 sends, to the information medium central control unit 312, the printing completion response received from the information management server apparatus 100 (ST29).

The information medium central control unit 312 sends, to the upper system unit 311, printing processing completion information indicating that the printing processing can be completed normally, and ends the processing. The printing processing completion information may include information regarding the duplicate document including the issued child management ID information.

Now, the operation for collecting the duplicate documents dc1 to dc3 is described with reference to FIG. 20.

In response to the operation performed by the user who has collected the duplicate documents dc1 to dc3, the exclusive reader 500 reads and sends, to the upper system unit 311, the child management IDs indicated by the child management ID tags (QR codes) of the duplicate documents dc1 to dc3 and the management ID indicated by the management ID tag (QR code) of the information asset management register dm.

The upper system unit 311 transmits a collection completion update request that includes the child management IDs of the duplicate documents dc1 to dc3 and the management ID of the information asset management register dm to the information management server apparatus 100 via the information medium central control unit 312 and the management request communication unit 314.

In the information management server apparatus 100, the information management control unit 104 receives the collection completion update request via the management request receiving unit 101 and the information management control unit 102.

In accordance with the collection completion update request, the information management control unit 104 updates the status information in the existence information in the systematic management table 1052 within the information management DB 105 to "collected" from "distributed", writes access log information indicating details of the update into the access log management table 1053, and transmits an update completion notice to the information medium controller 310 via the management request receiving unit 101 and the information management control unit 102.

In the information medium controller 310, the management file control unit 315 receives the update completion notice via the management request communication unit 314 and the information medium central control unit 312.

In accordance with the update completion notice, the management file control unit 315 writes an access log (the date, the type of operation "collected", and the child management ID) into the access log table 3162 within the management client DB 316, updates the status corresponding to the child management ID of the management file management table 3161 to "collected", and sends a DB update completion to the information medium central control unit 312.

On receipt of the DB update completion, the information medium central control unit 312 sends collection processing completion information to the upper system unit 311.

As described above, according to the present embodiment, when the access control policy and the permission policy are satisfied, the document print data that includes the child management ID and the electronic data body and the management register data that includes management register information are output on the basis of the processing result information that includes the management register information. This enables the strict and efficient distribution of duplicate documents even when a document under a prescribed strict management policy is duplicated. When a printed paper document is collected after being distributed, the collection completion update request that includes the child management ID indicating the child management ID tag read from the paper document is transmitted, and the status information is updated to "collected" in accordance with the child management ID in the collection completion update request. This enables the efficient collection of duplicate documents.

Therefore, even when a document under a prescribed strict management policy is duplicated, the strict and efficient document life cycle management ranging from the distribution to collection of a duplicate document is possible.

For example, suppose the following business scene as an example of a situation where a document under a prescribed strict management policy is duplicated. When a confidential material that needs to be collected is duplicated to paper documents for a meeting, serial numbers are manually written in the paper documents to be distributed, and a distribution management register for managing the destination and collection status of the document is made. In this case, for strict information management, it is necessary to examine every time whether the user who prints and copies the confidential material onto paper documents has, in operation, the authority to enable the operation and whether the destination has the authority to receive the paper documents.

However, according to the four conventional techniques, operations associated with information management such as the writing of the serial numbers, the creation of the register, and the examination of the authorities cannot be automated well. Thus, according to the four conventional techniques, there is concern over noncompliance resulting from possible human errors or the increase of operational load associated with information management.

In summary, one disadvantage of the four conventional techniques is that these techniques are not suitable to duplicate a document under a prescribed strict management policy and are incapable of strict document life cycle management of a duplicate document due to possible human errors. Another disadvantage of the four conventional techniques is that these techniques are incapable of efficient document life cycle management due to the increase of operational load associated with information management.

On the other hand, the present embodiment has no such disadvantages as described above.

Furthermore, according to the present embodiment, a duplicate document provided with a different management ID, and a document management register for managing the relation between a duplication original and a duplicate document and the management status (e.g., distribution, collection, and disposal) can be automatically output.

Thus, according to the present embodiment, the assignment of document management numbers before distribution and the creation of the management register can be automated, and the management status of each duplicate document can be efficiently reflected in the system via the child management ID of each duplicate document and the management ID of the management register.

For example, a management ID is read from a dimensional code printed on a duplicate document by the exclusive reader 500 or a portable terminal, and the status such as collection and disposal is sent to the information management server apparatus 100, so that the management status of the duplicate document is automatically reflected in the systematic management table 1052. By automatically compiling the reflections, it is possible to construct a system to efficiently specify and locate undistributed, uncollected, and undiscarded duplicate documents and prompt the owner or the person in charge of management by email or telephone to place the target duplicate documents under proper management.

Moreover, according to the present embodiment, it is also possible to construct a system to read a management ID from the management ID tag printed on a duplicate document by the exclusive reader 500 or a portable terminal, and ask the information management server apparatus 100 the expiration date for the use of the document and the date to discard and collect the document. Consequently, even when the management policy of the expiration date for use and the disposal and collection date is changed in the information management server apparatus 100, it is possible to construct a system whereby the user who has a duplicate document actively acquires information regarding the proper handling of the document.

Second Embodiment

FIG. 24 is a schematic diagram showing the configuration of a document management support system according to the second embodiment. The same parts as those in FIG. 5 are provided with the same signs, and are not described in detail. The differences are mainly described here. In the following embodiments, repeated explanations are also omitted.

The present embodiment is a modification of the first embodiment, wherein a duplicate document having a child management ID printed thereon is copied from a paper document having a management ID printed thereon. In the present embodiment, in the information medium controllers 300, a device such as a digital multi-function device or a copier which has an operation panel and which functions to copy a paper document from a paper document is treated as an information medium controller 320.

Here, the information medium controller comprises an upper system unit 321, an information medium central control unit 322, a context information acquisition unit 323, a management request communication unit 324, an IC card reading unit 325, a Web server unit 326, a panel control unit 327, a printing control unit 328, and a scanner unit 329.

The upper system unit 321 has a function of acquiring user ID information for a copying requester from the IC card reading unit 325 and screen selection information from the panel control unit 327, and sending the acquired information to the information medium central control unit 322 as copying request information. The upper system unit 321 also has a function of acquiring the user ID information and the screen selection information to request a Web page from the Web server unit 326 as needed, and acquiring panel display page information.

The information medium central control unit 322 has a function of requesting information on a paper document to be a copy original from the printing control unit 328 in response to the copying request information from the upper system unit 321, and acquiring parent management ID information for the copy original. The information medium central control unit 322 also has a function of acquiring context information from the context information acquisition unit 323, and a function of sending, to the management request communication unit 324, traceable copying request information that includes the copying request information, the parent management ID information for the copy original, and the context information.

The context information acquisition unit 323 has a function of acquiring context information regarding the medium controller 320 such as an IP address and a MAC address from, for example, a relevant function of an operating system in response to a context information request from the information medium central control unit 322, and sending the context information to the information medium central control unit 322.

The management request communication unit 324 has a function of communicating with the information management server apparatus 100 and sending the traceable copying request information on receipt of the traceable copying request information from the information medium central control unit 322, and a function of receiving server processing result information from the information management server apparatus and sending the information to the information medium central control unit 322.

The IC card reading unit 325 has a function of reading the user ID information from an IC card of the copying requester and sending the user ID information to the upper system unit 321.

The Web server unit 326 has a function of creating panel page information to be displayed on a panel of the information medium controller in response to a page request from the upper system unit 321, and then sending the panel page information to the upper system unit 321. The Web server unit 326 also has a function of acquiring user information necessary for the creation of the panel page information from a user management server apparatus 200.

The panel control unit 327 has a function of displaying, on the panel of the information medium controller 320, the panel page information received from the upper system unit 321, and a function of sending, to the upper system unit 321, the screen selection information selected on the panel screen.

The printing control unit 328 has a function of requesting the scanner unit 329' to scan copy parent document information in response to an original reading request from the information medium central control unit 322. The printing control unit 328 also has a function of analyzing and extracting, from the scanner unit 329, management ID information attached to the copy parent document information, and then sending the information to the information medium central control unit 322.

The scanner unit 329 has a function of reading a scan image of the parent document in response to a parent document scan request from the printing control unit 328, and sending scan result information including the scan image information to the printing control unit 328.

Figure 25:
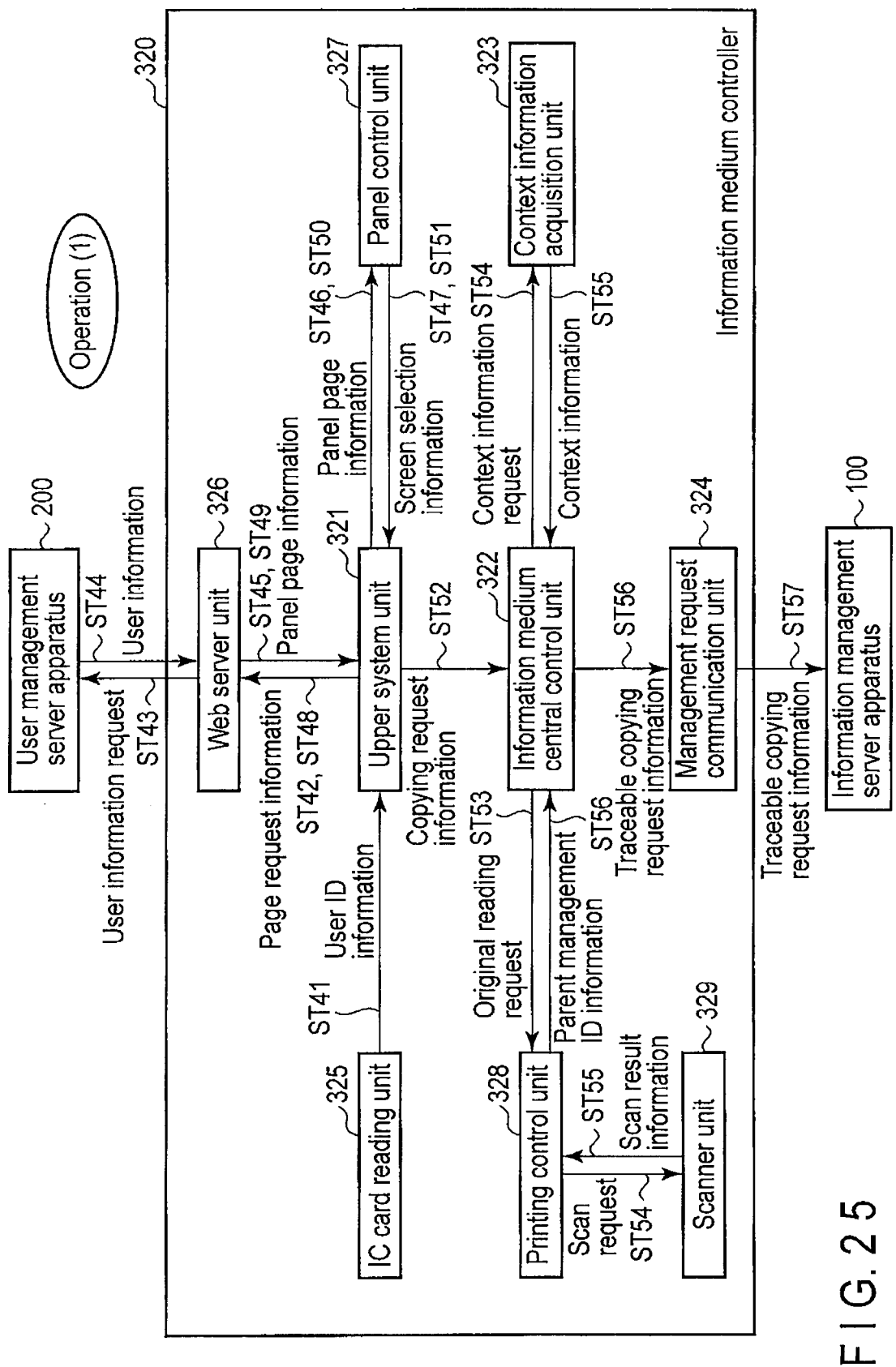
FIG. 25 is a schematic diagram for explaining the operation according to the embodiment.
Figure 26:
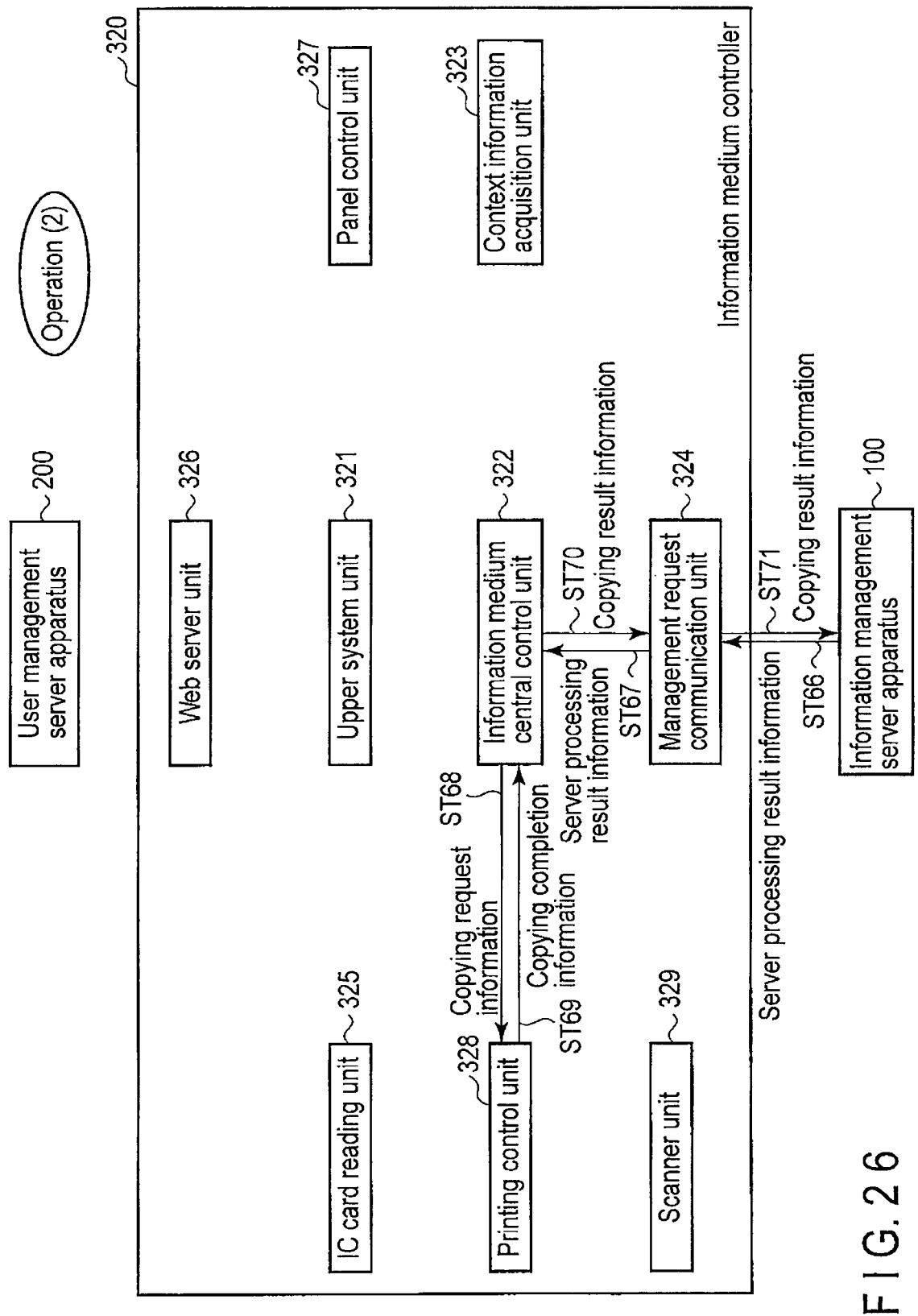
FIG. 26 is a schematic diagram for explaining the operation according to the embodiment.

Now, details of the operation for copying a duplicate document and printing the information asset management register are described with reference to the configuration diagrams of FIG. 25 to FIG. 27.

Figure 28:
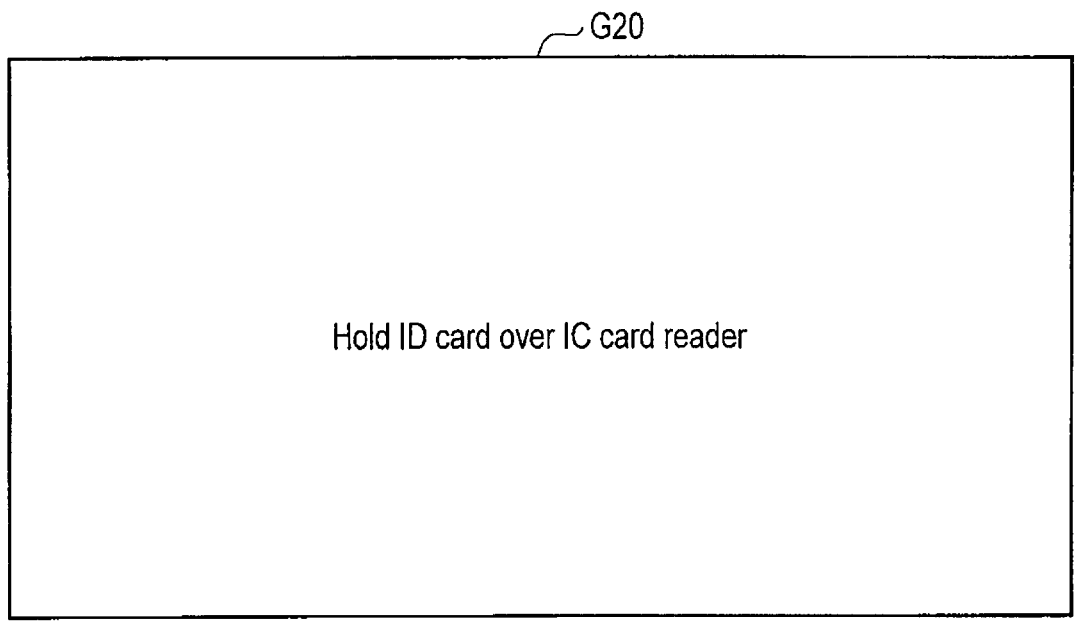
FIG. 28 is a schematic diagram showing a configuration example of a copying operation screen according to the embodiment.

As shown in the screen configuration example of FIG. 28 as a screen standby state, a screen G20 that prompts the user to hold his/her ID card over the IC card reader of the information medium controller 320 is displayed on the panel of the information medium controller 320. Here, if the ID card is held over the IC card reader, the IC card reading unit 325 sends the read user ID information to the upper system unit 321 (ST41).

The upper system unit 321 sends page request information that includes the received user ID information to the Web server unit 326 (ST42).

The Web server unit 326 sends a user information request that includes the user ID information included in the page request information to the user management server apparatus 200 (ST43).

The user management server apparatus 200 acquires user information related to the user ID from a user information request receiving unit 201 into a management client DB 202, and sends the user information to the Web server unit 326 (ST44). Here, the "user information related to the user ID" includes user information indicated by the user ID, and user information that overlaps (e.g., family name, division) the user information indicated by the user ID may be added.

Figure 29:
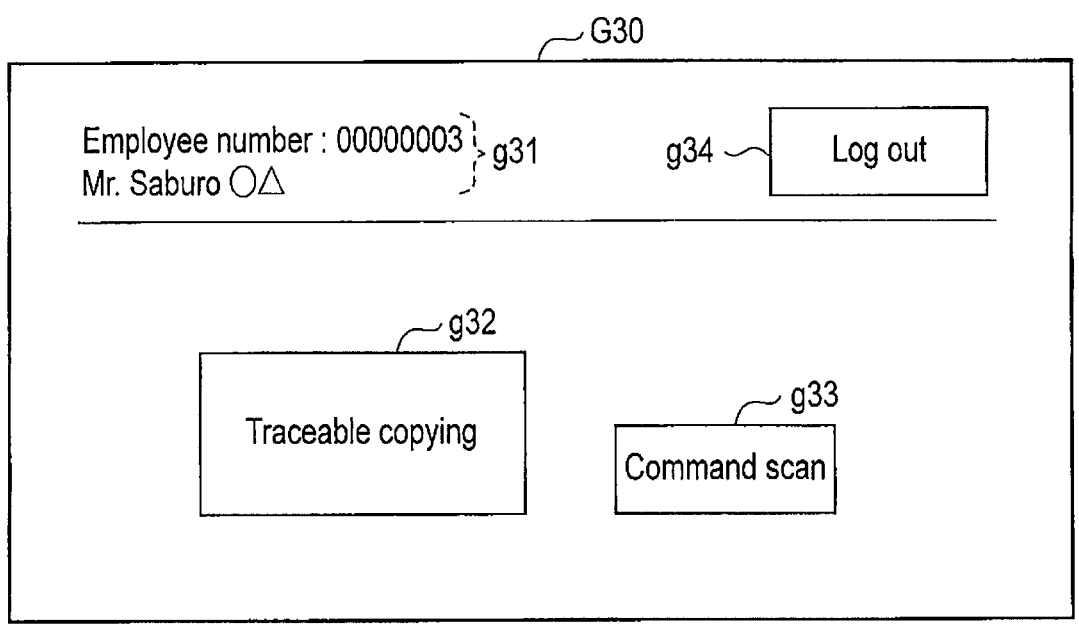
FIG. 29 is a schematic diagram showing a configuration example of the copying operation screen according to the embodiment.

The Web server unit 326 creates panel page information for displaying a panel operation screen Web page that includes the obtained user information and operation buttons, and then sends the panel page information to the upper system unit 321 (ST45). This Web page has only to include a display region g31 for requester information (the user information indicated by the user ID) and a copying operation button g32 indicating "traceable copying", as shown in the configuration example of a copying operation screen G30 in FIG. 29. A scan operation button g33 and a log-out operation button g34 may be omitted, as appropriate.

The upper system unit 321 sends the received panel page information to the panel control unit 327 (ST46).

The panel control unit 327 displays the received panel page information on the panel of the information medium controller 320. When the copying operation button g32 is selected via input means such as a touch panel on the panel, the panel control unit 327 sends the selected information to the upper system unit 321 as screen selection information (ST47).

The upper system unit 321 sends, to the Web server unit 326, page request information for requesting a panel page for traceable copying associated with the user ID (ST48).

Figure 30:
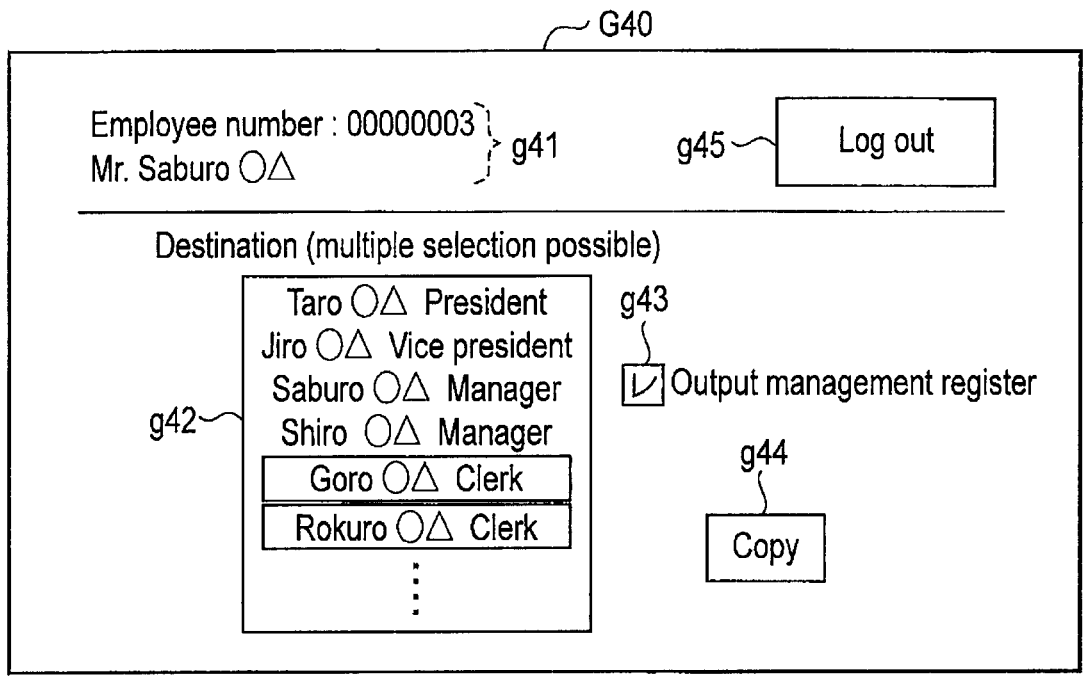
FIG. 30 is a schematic diagram showing a configuration example of the copying operation screen according to the embodiment.

As shown in FIG. 30, the Web server unit 326 creates panel page information for displaying a screen G40 that includes requester information g41, destination information selection region g42, a check box g43 for determining whether to output a management register, a copying operation button g44, and a log-out operation button g45. The Web server unit 326 then sends the panel page information to the upper system unit 321 (ST49). As the destination information, the user information (user information having common attributes) acquired in step ST44 may be used, or the user information (user information having common attributes) acquired by again performing processing similar to that in step ST44 may be used (when the user information having common attributes is not acquired).

The upper system unit 321 sends the panel page information to the panel control unit 327 (ST50).

The panel control unit 327 displays the received panel page information on the panel of the information medium controller 320. The panel control unit 327 then sends, to the upper system unit 321, screen selection information that includes the destination information selected on the panel and information on whether to output a management register (ST51).

The upper system unit 321 sends, to the information medium central control unit 322, copying request information that includes the user ID information for the copying requester, the destination information, and the information on whether to output a management register (ST52).

The information medium central control unit 322 sends, to the printing control unit 328, an original reading request to read an original which is a copy original (ST53).

On receipt of the original reading request, the printing control unit 328 sends, to the scanner unit 329, a scan request to request the scan image information for the original (ST54).

On receipt of the scan request, the scanner unit 329 sends, to the printing control unit 328, scan result information that includes the scan image information obtained by reading the original which is the copy original (ST55).

The printing control unit 328 acquires the management ID information in the embedded document information from the scan image information, and sends the management ID information to the information medium central control unit 322 as parent management ID information (ST56).

On receipt of the parent management ID information, the information medium central control unit 322 sends, to the context information acquisition unit 323, a context information request to acquire information on the information medium controller 320 during request when the request is made (ST57).

As in ST2 according to the first embodiment, the context information acquisition unit 323 uses the function of the operating system to acquire, as the context information, information such as the IP address of the information medium controller 320 that shows where and how the information medium controller 320 is used. The context information acquisition unit 323 then sends the information to the information medium central control unit 322 (ST55).

The information medium central control unit 322 sends, to the management request communication unit 324, traceable copying request information ST56 that includes the copying request information acquired from the upper system unit 321, the parent management ID information acquired from the printing control unit 328, and the context information acquired from the context information acquisition unit 323 (ST56).

The management request communication unit 324 communicates with the information management server apparatus 100, and sends the traceable copying request information (ST57).

The information management server apparatus 100 performs processing similar to the processing in steps ST5 to ST14 in the first embodiment, and sends server processing result information to the information medium controller 320 (ST58 to ST66). Here, the traceable printing request information is read as the traceable copying request information.

The management request communication unit 324 sends, to the information medium central control unit 322, the server processing result information received from the information management server apparatus 100 (ST67).

The information medium central control unit 322 sends, to the printing control unit 328, duplication request information that includes the child management ID information and the management register information included in the server processing result information (ST68).

On receipt of the copying request information, the printing control unit 328 creates an optical code such as a bar code, a two-dimensional code, a color code, or a watermark from the child management ID information, and creates, for each duplicate document, print data that is overlaid on optical code information for the parent management ID information in the scan image of the parent document, and prints the data. The printing control unit 328 also processes the management register information and prints the management register. When the output of the documents is completed, the printing control unit 328 sends copying completion information to the information medium central control unit 322 (ST69).

On receipt of the copying completion information, the information medium central control unit 322 sends copying result information to the management request communication unit 324 (ST70).

The management request communication unit 324 sends the copying result information to the information management server apparatus 100 (ST71).

The information management server apparatus 100 performs processing similar to the processing in steps ST23 to ST28 in the first embodiment, and sends a copying completion response to the information medium controller 320 (ST76). Here, the printing completion response is read as the copying completion response.

The management request communication unit 324 sends, to the information medium central control unit 322, the copying completion response received from the information management server apparatus 100 (ST77).

On receipt of the copying completion response, the information medium central control unit 322 sends, to the upper system unit 321, copying processing completion information for reporting the completion of copying on the panel (ST78).

The upper system unit 321 sends the copying processing completion information to the Web server unit 326 as page request information (ST79).

Figure 31:
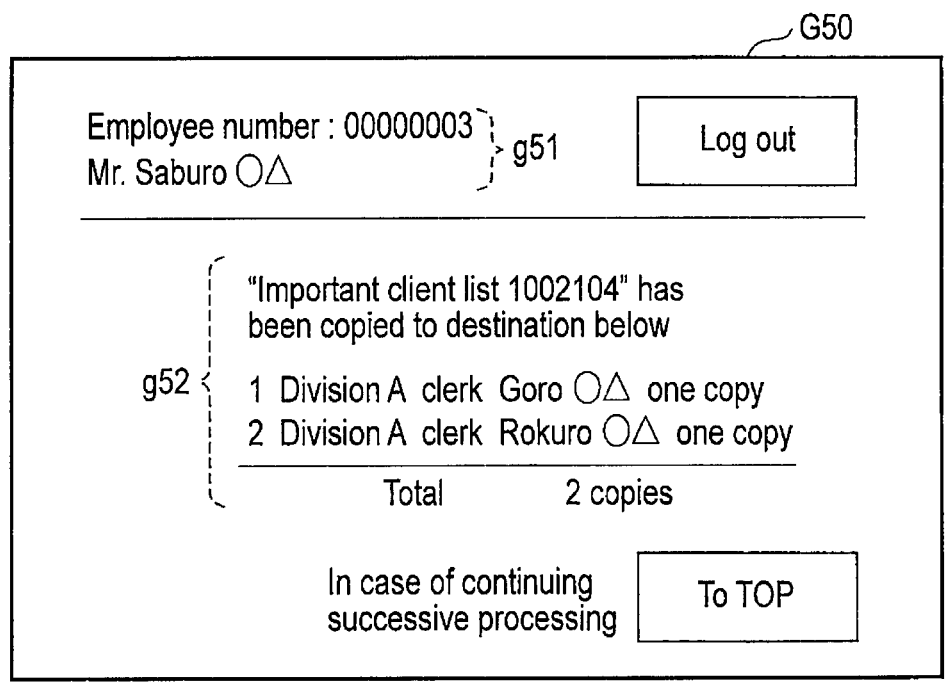
FIG. 31 is a schematic diagram showing a configuration example of the copying operation screen according to the embodiment.

As shown in FIG. 31, the Web server unit 326 creates panel page information for displaying a screen G50 that includes requester information g51, and a copying completion message g52 including the parent management ID, the destination information, and the number of duplicate documents. The Web server unit 326 then sends the panel page information to the upper system unit 321 (ST80).

The upper system unit 321 sends the panel page information to the panel control unit 327 (ST81).

The panel control unit 327 displays the screen G50 shown in FIG. 31 in accordance with the panel page information, and ends the processing.

The operation for collection is performed as in the first embodiment.

As described above, according to the present embodiment, it is possible to obtain advantages similar to those in the first embodiment even when a duplicate document having a child management ID printed thereon is copied from a paper document having a management ID printed thereon.

Furthermore, according to the embodiments described above, it is possible to restrict the duplication of documents and at the same time manage the life cycles of the documents.

The method described in the embodiment can also be stored in a storage medium such as a magnetic disk (Floppy™ disk, hard disk, or the like), an optical disk (CD-ROM, DVD, or the like), a magneto-optical disk (MO), or a semiconductor memory as a program which can be executed by a computer and distributed.

As the storage medium, any configuration which is a computer-readable storage medium in which a program can be stored may be used regardless of a storage format.

An OS (operating system) which operates on a computer on the basis of an instruction of a program installed from the storage medium in the computer, database management software, and MW (middleware) such as network software may execute a part of the processes to realize the embodiment.

Furthermore, the storage medium according to the present invention includes not only a medium independent of a computer but also a storage medium in which a program transmitted through a LAN, the Internet, or the like is downloaded and stored or temporarily stored.

The number of storage media is not limited to one. A case in which the process in the embodiment is executed from a plurality of media is included in the storage medium according to the present invention. Any medium configuration may be used.

A computer according to the present invention is to execute the processes in the embodiments on the basis of the program stored in a storage medium. The computer may have any configuration such as one apparatus constituted by a personal computer or a system in which a plurality of apparatuses are connected by a network.

A computer in the present invention includes not only a personal computer but also an arithmetic processing apparatus, a microcomputer, or the like included in an information processing apparatus. The computer is a generic name of an apparatus and a device which can realize the functions of the present invention by a program.

The present invention is not limited to the embodiments. The invention can be embodied by changing the constituent elements in an execution phase without departing from the spirit and scope of the invention. In addition, various inventions can be formed by appropriate combinations of the plurality of constituent elements disclosed in the embodiments. For example, several constituent elements may be deleted from all the constituent elements described in the embodiments. Furthermore, the constituent elements over the different embodiments may be appropriately combined with each other.

What is claimed is:

1. A document management support system comprising information medium controllers that are configured to communicate with one another, and an information management server apparatus, wherein each of the information medium controllers comprises a non-transitory hardware memory which stores a management file management table into which a management file including a management ID and an electronic data body is written, a duplication request sending unit which receives a management ID, duplication requester information, and destination information corresponding to an electronic data body to be duplicated, and sends duplication request information including the received management ID, duplication requester, and destination information, a traceable duplication request transmitting unit which transmits, to the information management server apparatus, traceable duplication request information including the sent duplication request information and address information for the information medium controller, a processing result receiving unit which receives, from the information management server apparatus, processing result information that includes the management ID in the traceable duplication request information, a child management ID tag indicating a child management ID different from the management ID, and management register information comprising the destination information, after the traceable duplication request information is transmitted, a print data outputting unit which extracts the electronic data body from the management file on the basis of the management ID which corresponds to the electronic data body to be duplicated, creates document print data that includes the extracted electronic data body, and the child management ID tag and the destination information included in the processing result information and also creates management register print data including the management register information, and then outputs the document print data and the management register print data, and a collection completion update request transmitting unit which, when a paper document printed by the output document print data is collected after being distributed and then the child management ID indicated by the child management ID tag is read from the paper document by tag reading unit, makes a collection completion update request including the read child management ID, and transmits the collection completion update request to the information management server apparatus, and the information management server apparatus comprises a systematic management table storage unit which stores a systematic management table into which, for each management ID of the management file, a child management ID and status information associated with the management ID, and an access control policy based on duplication requester information and destination information are written, a master policy table storage unit which stores a master policy table that includes a permission policy based on the address information for the information medium controller, a first judgment unit which judges whether the duplication requester information and the destination information in the traceable duplication request information received from the duplication request transmitting unit satisfy the access control policy in the systematic management table corresponding to the management ID in the traceable duplication request information, a second judgment unit which judges whether the address information in the received traceable duplication request information satisfies the permission policy, a child management ID issuing unit which, when the access control policy and the permission policy are judged by the first and second judgment unit to be satisfied, issues a child management ID different from the management ID in the received traceable duplication request information, and writes this child management ID into the systematic management table on the basis of the management ID in the traceable duplication request information, and also updates the status information corresponding to the written child management ID to "distributed", a management register information creating unit which creates management register information that includes a child management ID tag indicating the issued child management ID, the management ID in the traceable duplication request information, and the destination information, and transmits the processing result information that includes the management register information to the information medium controller which is the transmission source of the traceable duplication request information, and a collection completion update unit which updates the status information to "collected" on the basis of the child management ID in the collection completion update request received from the collection completion update request transmitting unit.

2. An information medium controller configured to communicate with an information management server apparatus, the information management server apparatus holding a systematic management table into which, for each management ID of the management file, a child management ID and status information associated with the management ID, and an access control policy based on duplication requester information and destination information are written, the information management server apparatus also holding a master policy table that includes a permission policy based on the address information for the information medium controller, the information medium controller comprising:

a non-transitory hardware memory which stores a management file management table into which a management file including a management ID and an electronic data body is written;

a duplication request sending unit which receives a management ID, duplication requester information, and destination information corresponding to an electronic data body to be duplicated, and sends duplication request information including the received management ID, duplication requester, and destination information;

a traceable duplication request transmitting unit which transmits, to the information management server apparatus, traceable duplication request information including the sent duplication request information and address information for the information medium controller;

a processing result receiving unit which, in the information management server apparatus, judges whether the duplication requester information and the destination information in the traceable duplication request information received from the traceable duplication request transmitting unit satisfy the access control policy in the systematic management table corresponding to the management ID in the traceable duplication request information, judges whether the address information in the received traceable duplication request information satisfies the permission policy, issues a child management ID different from the management ID in the received traceable duplication request information when the access control policy and the permission policy are satisfied, writes this child management ID into the systematic management table on the basis of the management ID in the traceable duplication request information, updates the status information corresponding to the written child management ID to "distributed", creating management register information that includes a child management ID tag indicating the issued child management ID, the management ID in the traceable duplication request information, and the destination information, and transmits the processing result information that includes the management register information, thereby receiving the processing result information transmitted from the information management server apparatus;

a print data outputting unit which extracts the electronic data body from the management file on the basis of the management ID included in the management register information in the received processing result information, creates document print data that includes the extracted electronic data body, and the child management ID tag and the destination information in the management register information and also creates management register print data including the management register information, and then outputs the document print data and the management register print data; and a collection completion update request transmitting unit which, when a paper document printed by the output document print data is collected after being distributed and then the child management ID indicated by the child management ID tag is read from the paper document by tag reading unit, makes a collection completion update request which includes the read child management ID and which updates the status information to "collected", and transmits the collection completion update request to the information management server apparatus.

3. An information management server apparatus configured to communicate with an information medium controller holding a management file management table into which a management file including a management ID and an electronic data body is written, the information management server apparatus comprising:

a non-transitory hardware memory which stores a systematic management table into which, for each management ID of the management file, a child management ID and status information associated with the management ID, and an access control policy based on duplication requester information and destination information are written;

a master policy table storage unit which stores a master policy table that includes a permission policy based on the address information for the information medium controller;

a unit which receives, from the information medium controller, duplication request information including the management ID, duplication requester information, and destination information which are input to the information medium controller and which correspond to the electronic data body to be duplicated, and traceable duplication request information including the address information for the information medium controller;

a first judgment unit which judges whether the duplication requester information and the destination information in the received traceable duplication request information satisfy the access control policy in the systematic management table corresponding to the management ID in the traceable duplication request information;

a second judgment unit which judges whether the address information in the received traceable duplication request information satisfies the permission policy;

a child management ID issuing unit which, when the access control policy and the permission policy are judged by the first and second judgment unit to be satisfied, issues a child management ID different from the management ID in the received traceable duplication request information, and writes this child management ID into the systematic management table on the basis of the management ID in the traceable duplication request information, and also updates the status information corresponding to the written child management ID to "distributed";

a management register information creating unit which creates management register information that includes a child management ID tag indicating the issued child management ID, the management ID in the traceable duplication request information, and the destination information, and transmits the processing result information that includes the management register information to the information medium controller;

a unit which, in the information medium controller, extracts the electronic data body from the management file on the basis of the management ID included in the management register information in the received processing result information, creates document print data that includes the extracted electronic data body, and the child management ID tag and the destination information in the management register information and also creates management register print data including the management register information, outputs the document print data and the management register print data, and when a paper document printed by the output document print data is collected after being distributed and then the child management ID indicated by the child management ID tag is read from the paper document by tag reading unit, makes a collection completion update request including the read child management ID, and transmits the collection completion update request, thereby receiving the collection completion update request from the information medium controller; and a collection completion update unit which updates the status information to "collected" on the basis of the child management ID in the received collection completion update request.

* * * * *